US009753756B2

(12) United States Patent
Yoshida

(10) Patent No.: US 9,753,756 B2
(45) Date of Patent: Sep. 5, 2017

(54) INFORMATION PROCESSING SYSTEM, INFORMATION PROCESSING METHOD, AND COMPUTER READABLE RECORDING MEDIUM STORING A PROGRAM

(71) Applicant: FUJITSU LIMITED, Kawasaki-shi, Kanagawa (JP)

(72) Inventor: Taketoshi Yoshida, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 524 days.

(21) Appl. No.: 14/462,927

(22) Filed: Aug. 19, 2014

(65) Prior Publication Data
US 2014/0359134 A1   Dec. 4, 2014

Related U.S. Application Data

(63) Continuation of application No. PCT/JP2012/057069, filed on Mar. 19, 2012.

(51) Int. Cl.
*G06F 15/173* (2006.01)
*G06F 9/455* (2006.01)
*G06F 9/48* (2006.01)
*H04L 12/801* (2013.01)
*H04L 29/08* (2006.01)

(52) U.S. Cl.
CPC ........ *G06F 9/45558* (2013.01); *G06F 9/4856* (2013.01); *H04L 47/11* (2013.01); *H04L 67/10* (2013.01); *G06F 2009/4557* (2013.01)

(58) Field of Classification Search
CPC ........... G06F 2009/4557; G06F 9/4856; G06F 11/1469; G06F 11/203; G06F 11/2058; G06F 3/0647; G06F 11/1484; G06F 3/065
See application file for complete search history.

(56) References Cited

U.S. PATENT DOCUMENTS

| 8,694,685 B2 * | 4/2014 | Heywood | G06F 9/4862 709/223 |
|---|---|---|---|
| 2004/0128670 A1 | 7/2004 | Robinson et al. | |
| 2009/0055507 A1 | 2/2009 | Oeda | |
| 2010/0070474 A1 * | 3/2010 | Lad | G06F 3/0605 707/624 |

(Continued)

FOREIGN PATENT DOCUMENTS

| JP | 2006-519423 | 8/2006 |
|---|---|---|
| JP | 2009-48607 | 3/2009 |

(Continued)

OTHER PUBLICATIONS

International Search Report of PCT/JP2012/057069 dated May 15, 2012.

*Primary Examiner* — Benjamin M Thieu
(74) *Attorney, Agent, or Firm* — Staas & Halsey LLP

(57) ABSTRACT

A first network device determines whether it is available to transmit division data which is transmitted from a first virtual machine execution apparatus to a second network device which is provided at a side of a second virtual machine execution apparatus among a plurality of network devices, and stores the division data in a storing device when determining that it is not available to transmit, and transmit the division data in the storing device to the second network device when determining that it is available to transmit the division data to the second network device.

20 Claims, 31 Drawing Sheets

(56) References Cited

U.S. PATENT DOCUMENTS

| | | |
|---|---|---|
| 2011/0246669 A1 | 10/2011 | Kanada et al. |
| 2012/0054367 A1* | 3/2012 | Ramakrishnan ...... G06F 9/4856 709/242 |
| 2012/0221744 A1* | 8/2012 | Heywood ............. G06F 9/4862 709/247 |
| 2012/0233285 A1* | 9/2012 | Suzuki ................. G06F 9/4856 709/216 |
| 2012/0254131 A1* | 10/2012 | Al Kiswany ..... G06F 17/30233 707/692 |
| 2012/0278571 A1* | 11/2012 | Fleming ................. G06F 9/455 711/162 |
| 2012/0278807 A1* | 11/2012 | Nakagawa ........... G06F 9/4856 718/1 |
| 2013/0275708 A1* | 10/2013 | Doi ..................... H04L 63/1425 711/165 |

FOREIGN PATENT DOCUMENTS

| | | |
|---|---|---|
| JP | 2010-237926 | 10/2010 |
| JP | 2011-146002 | 7/2011 |
| JP | 2011-210032 | 10/2011 |

\* cited by examiner

FIG. 9

| IP ADDRESS OF ORIGIN OF MOVEMENT | IP ADDRESS OF DESTINATION OF MOVEMENT | DIVISION DATA INFORMATION | | SIZE |
|---|---|---|---|---|
| | | IDENTIFIER | CONTEXT IDENTIFIER | |
| 0.1.2.3 | 1.2.5.7 | ID151_1 | 1 | 10Mbyte |
| 0.1.2.3 | 1.2.5.7 | ID151_2 | 1 | 10Mbyte |
| ... | ... | ... | ... | ... |
| 0.1.2.3 | 1.2.5.7 | ID151_m | 1 | 10Mbyte |
| 0.1.2.3 | 1.2.5.7 | ID152_1 | 0 | 10Mbyte |
| 0.1.2.3 | 1.2.5.7 | ID152_2 | 0 | 10Mbyte |
| ... | ... | ... | ... | ... |
| 0.1.2.3 | 1.2.5.7 | ID152_n | 0 | 10Mbyte |

| ALLOTMENT CLOCK SPEED | QUANTITY OF ALLOTMENT MEMORY | QUANTITY OF ALLOTMENT HDD | ALLOTMENT NETWORK BAND |
|---|---|---|---|
| 2.0GHz | 2GB | 100GB | 1Gbps |

| IP ADDRESS OF ORIGIN OF MOVEMENT | IP ADDRESS OF DESTINATION OF MOVEMENT | DIVISION DATA INFORMATION | | SIZE |
|---|---|---|---|---|
| | | IDENTIFIER | CONTEXT IDENTIFIER | |
| 0.1.2.3 | 1.2.5.7 | ID151_1 | 1 | 10Mbyte |
| 0.1.2.3 | 1.2.5.7 | ID151_2 | 1 | 10Mbyte |
| ... | ... | ... | ... | ... |
| 0.1.2.3 | 1.2.5.7 | ID151_m | 1 | 10Mbyte |
| 0.1.2.3 | 1.2.5.7 | ID152_1 | 0 | 10Mbyte |

155

INFORMATION PROCESSING SYSTEM, INFORMATION PROCESSING METHOD, AND COMPUTER READABLE RECORDING MEDIUM STORING A PROGRAM

CROSS-REFERENCE TO RELATED APPLICATION

This application is a continuation application of International Application PCT/JP2012/057069 filed on Mar. 19, 2012 and designated the U.S., the entire contents of which are incorporated herein by reference.

FIELD

The embodiments discussed herein are related to an information processing system, an information processing method, and a computer readable recording medium stored a program.

BACKGROUND

A migration process is that a server device which performs a virtual machine moves this virtual machine to another server device, then the another server device performs this virtual machine (referring to patent documents 1).

[Patent documents 1] Japanese Laid-open Patent publication No. 2011-146002.

On the other hand, it is performed that a large number of the server device which use a business are distributed to two or more data centers in a company and a public institution, etc. This data center builds a virtual machine (VM) to one or more server device, and the virtual machine performs variety of information processing relating to the above described business. In addition, when the data center belongs to a service company, it is performed to provide users with the virtual machine which is built to the server device. This service is called to cloud service (IaaS: Infrastructure as a Service).

In the system which consisted of two or more of these data centers, it is effective that the server device allocated in the first data center migrates the virtual machine which is performed by the server device to another server device in the second data center which is isolated geographically from the first data center and operates independently from the first data center. For example, it is effective to perform migration for the purpose of the case where the first data center suffered a great deal of damage and fails for power, the case of reduction of cooling cost in the data center which used the seasonal difference of the area, and the case of operation cost reduction using low charge electric power at night, etc.

When the migration is performed between such data centers from which it is geographically separated, various restrictions arise. For example, it is assumed that the first data center suffers a great deal of damage, and is continued electric supply only for a short time. In this case, the first server device that is performing the virtual machine in the first data center is required to transmit this virtual machine to within a time which this electric supply is supplied.

However, for example, there is a case that the network between the first and second data centers is crowded, and a case the network between the first and second data centers may become narrow in bandwidth. In addition, there is a case that traffic may decrease due to an increase of the processing load in a certain network device (for example, switching device, router device) which is prepared between the first and second data center, although the bandwidth of the network is fully secured.

In such a case, because the network between the first and second data center serves as a bottleneck of data transmission, it becomes difficult that the first server device performs the migration at high speed. If it puts in another way, it will require time that the first server device in the first data center moves the virtual machine currently performed to the second server device in the second data center which is a destination, and the second server device builds the same virtual machine as this virtual machine.

Especially, it is difficult that the first server device in the first data center moves these virtual machines to the second server device in the second data center at high speed, when the first server device performs the virtual machines of the thousands and tens of thousands of units.

SUMMARY

According to an aspect of the embodiments, an information processing system includes a first virtual machine execution apparatus configured to perform a first virtual machine, divide data relating to the first virtual machine in a plurality of division data and transmit the division data to a second virtual machine execution apparatus via a first network device among a plurality of network devices in response to a migration instruction, the second virtual machine execution apparatus configured to perform a second virtual machine and build up the first virtual machine based on the division data transmitted from the first virtual machine execution apparatus, and the plurality of network devices provided between the first virtual machine execution apparatus and the second virtual machine execution apparatus and configured to perform data communication process, and the first network device is configured to determine whether it is available to transmit the division data which is transmitted from the first virtual machine execution apparatus to a second network device which is provided at a side of the second virtual machine execution apparatus among the plurality of network devices and store the division data in a storing device when determining that it is not available to transmit, and transmit the division data in the storing device to the second network device when determining that it is available to transmit the division data to the second network device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is an example diagram of a table which is storing the variety of information about the division data as explained in FIG. 3.

FIG. 10 is an example diagram of a table which is storing the hardware resources assigned to the virtual machine as explained in FIG. 3.

FIG. 18 is an example diagram of a table which is storing data relating to the division data of which the switching device as illustrated by FIG. 14 and FIG. 15 has cached.

DESCRIPTION OF EMBODIMENTS

Hereinafter, each of embodiments is explained based on drawings. In addition, in each drawing, the component which has the same function is attached same mark and sign, and explanation for the second time is omitted suitably.

[A First Embodiment]

(Information Processing System)

Figure 1:
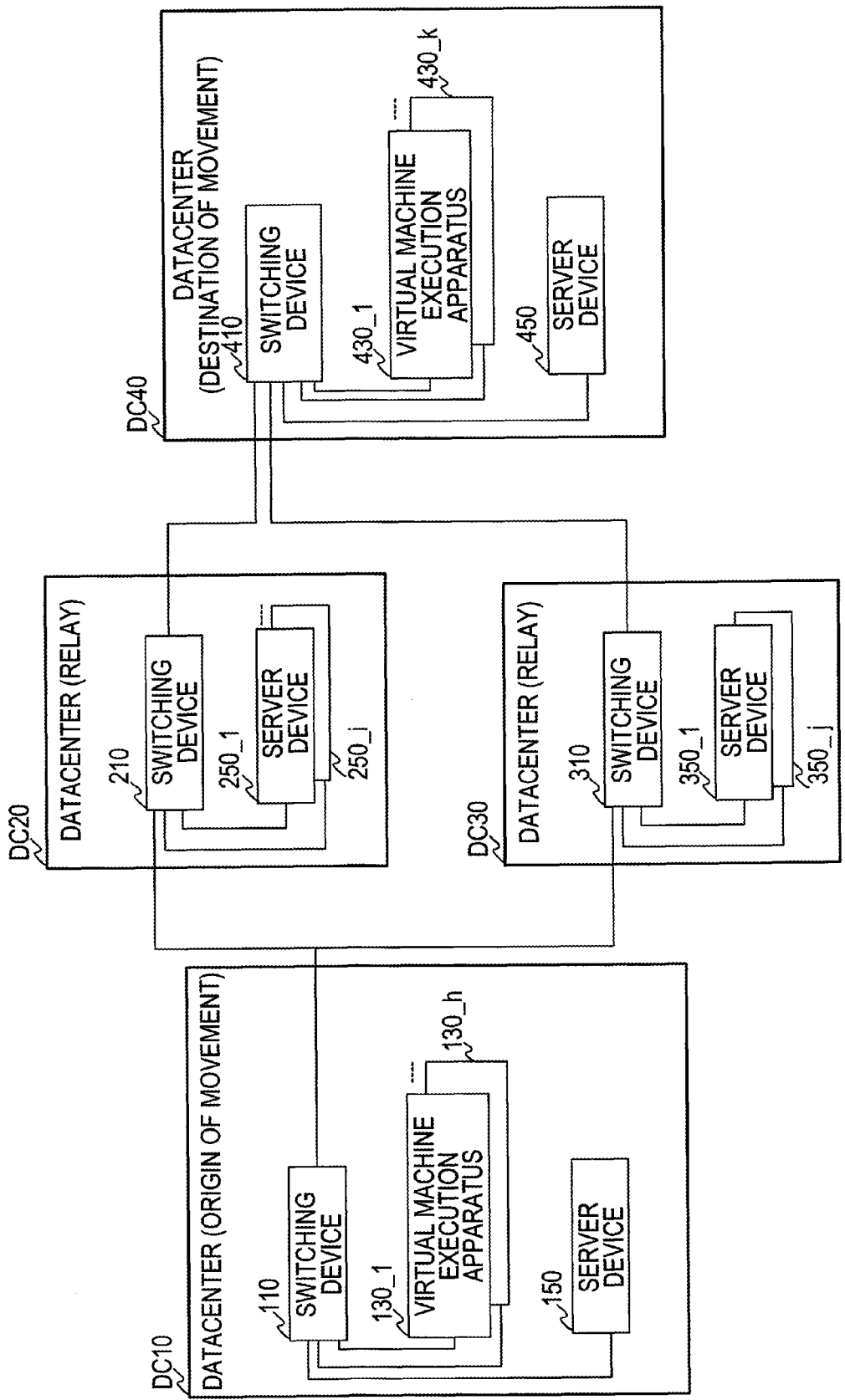
FIG. 1 is a schematic structure diagram of the information processing system in a first embodiment.

FIG. 1 is a schematic structure diagram of the information processing system 1 according to a first embodiment. The information processing system 1 has a first data center DC10~a forth data center DC40. Each of data centers DC10, DC20, DC30, and DC40 is installed in a geographically distant position, and perform variety information processing on the business in a company or a public institution, for example.

And each of the data center DC10, DC20, DC30, and DC40 build a virtual machine to the real machine in the data center and perform the above mentioned variety information processing and cloud service using this virtual machine.

In the following explanation, an example depicts that the first data center DC10 migrates the virtual machine which has been executed by the first data center DC10 to the fourth data center DC40 via the second data center DC20 and the third data center DC30. Then, the first data center DC10 is defined as the origin data center of the virtual machine, the second and third data center DC20 and DC30 are defined as the data centers of relay, and the fourth data center DC40 is defined as a destination data center of the virtual machine.

For example, it is assumed that the bottleneck of data communications has occurred in the network between the virtual machine execution apparatus of transfer origin (for example, the virtual machine execution apparatus 130_1 in FIG. 1) which is installed in the first data center (transfer origin) DC10 and the virtual machine execution apparatus (for example, the virtual machine execution apparatus 430_1 in FIG. 1) which is installed in the fourth data center (destination) DC40.

When the above-mentioned bottleneck occurs, it is difficult that the virtual machine execution apparatus 130_1 in the first data center DC10 transmits all data relevant to all the virtual machines of the migration target to other data centers DC due to this bottleneck. In addition, when the data volume relevant to these virtual machines is still huger, it becomes more difficult to transfer the data.

Especially, in a case that the first data center DC10 suffers and is continued electric power supply only for a short time due to a disaster, etc., because this virtual machine is eliminated, when it is difficult that the virtual machine execution apparatus 130_1 of the first data center DC10 transmits the data relevant to the virtual machine for migration target to other data centers DC within this short time, it becomes impossible to continue the business process (migration is unsuccessful).

In the first embodiment, the network device (for example, switching device 210), which is installed between the first and fourth data centers DC10 and DC40, stores temporarily (called as cash) the division data of the virtual machine of the migration target. Therefore, it is possible that the virtual machine execution apparatus 130_1 of the transfer origin stores (transmits) temporarily the data relevant to the virtual machine of the migration target on the network device 210, because the network device stores the division data.

And when the above-mentioned bottleneck is solved, the network device 210 transmits the division data which was being stored to the virtual machine execution apparatus 430_1 of the fourth data center DC40 which is a destination. Therefore, it is possible that based on this division data, the virtual machine execution apparatus 430_1 of the destination which received this division data builds this virtual machine. Therefore, it is possible to quickly resume operation.

The above-mentioned network device is a communication device which executes connection between the networks, and, for example, is a switching device or a router device or a hub device. In the following explanation, a switching device is illustrated as the network device.

The construction of the first data center DC10~the fourth data center and each of the data centers DC10, DC20, DC30, and DC40 will be explained by using FIG. 1. In addition, in the following explanation, signs "h", "i", "j" and "k" are integers greater than or equal to 2.

As depicted in FIG. 1, the first data center DC10 has the switching device 110, the first virtual machine execution apparatus 130_1~the h-th virtual machine execution apparatus 130_h, and a server device 150.

The switching device 110 in the first data center DC10 connects to the switching device 210 in the second data center DC20 and the switching device 310 in the third data center DC30 via a network. The switching device 110 in the first data center DC10 is a network device which has the switching function to perform data relay in the network. This switching function is a layer 2 switch (L2 switch) function and a layer 3 switch (L3 switch) function, for example.

The switching device 110 performs the switching of the data communications in the first data center DC10, and performs the switching of the data communications between the second data center DC20 and the third data center DC30.

Each of the first virtual machine execution apparatus 130_1~the h-th virtual machine execution apparatus 130_h in the first data center is a device which executes the virtual machine which performs information processing on the virtualized hardware resources. The server device 150 in the first data center DC10 has a function of a administration server which manages the first virtual machine execution apparatus 130_1~the h-th virtual machine execution apparatus 130_h.

The first virtual machine execution apparatus 130_1~the h-th virtual machine execution apparatus 130_h, and the server device 150 connect with the switching device 110 and perform the data communications in the first data center DC10, and performs the data communication to the other second data centers DC20, DC30, DC40. In addition, the data communications in the data center DC is the data communication of which application program performs between the virtual machines of the first virtual machine execution apparatus 130_1~the h-th virtual machine execution apparatus 130_h, and the data communications for monitoring and observation of these virtual machine execution apparatus.

The second data center DC20 has the switching device 210 and a first server device 250_1~a i-th server device 250_i.

The switching device 210 in the second data center DC20 has the same switching function as the switching device 110 in the first data center DC10. The switching device 210 performs the switching of the data communications in the second data center DC20, and performs the switching of the data communications between the first data center DC10 and the fourth data center DC40. Each of the first server device 250_1~the i-th server device 250_i has a virtual machine execution function and a control function of the virtual machine, for example.

The third data center DC30 has a switching device 310 and a first server device 350_1~a j-th server device 350_j.

The switching device 310 in the third data center DC30 connects to the switching device 110 in the first data center DC10 and the switching device 410 in the fourth data center DC40 via a network.

The switching device 310 in the third data center DC30 has the same switching function as the switching device 110 in the first data center DC10. The first server device 350_1~the j-th server device 350_j has a virtual machine execution function and a controlling function of the virtual machine, for example.

The fourth data center DC40 has a switching device 410, a first virtual machine execution apparatus 430_1~a k-th virtual machine execution apparatus 430_k and a server device 450.

The switching device 410 in the fourth data center DC40 connects to the switching device 210 in the second data center DC20 and the switching device 310 in the third data center DC30 via a network.

The switching device 410 in the fourth data center DC40 has the same switching function as the switching device 110 in the first data center DC10.

The switching device 410 performs a switching of the data communications in the fourth data center DC40, and performs the switching of the data communications between the second data center DC20 and the third data center DC30.

Each of the first virtual machine execution apparatus 430_1~the k-th virtual machine execution apparatus 430_h in the fourth data center DC40 is a device which executes the virtual machine which performs information processing on the virtualized hardware resources. The server device 450 in the fourth data center DC40 has a function of a administration server which manages the first virtual machine execution apparatus 430_1~the k-th virtual machine execution apparatus 430_k.

The first virtual machine execution apparatus 430_1~the k-th virtual machine execution apparatus 430_k, and the server device 450 connect with the switching device 410 and perform the data communications in the fourth data center DC40, and performs the data communication to the other first data center DC10, the second data center DC20, and the third data center DC30.

In addition, as network connection explained above, the dedicated network circuit which connects between the data centers may be sufficient, and, otherwise, a public network circuit, such as the Internet, may be sufficient, for example.

(Virtual Machine Execution Apparatus in the First Data Center DC10)

Based on FIG. 2 and FIG. 3, the first virtual machine execution apparatus 130_1 in the first data center DC10 which is a transfer origin will be explained. The Virtual machine execution apparatus other than the first virtual machine execution apparatus 130_1 in the first data center DC10 may also have the same composition as the first virtual machine execution apparatus 130_1.

Figure 2:
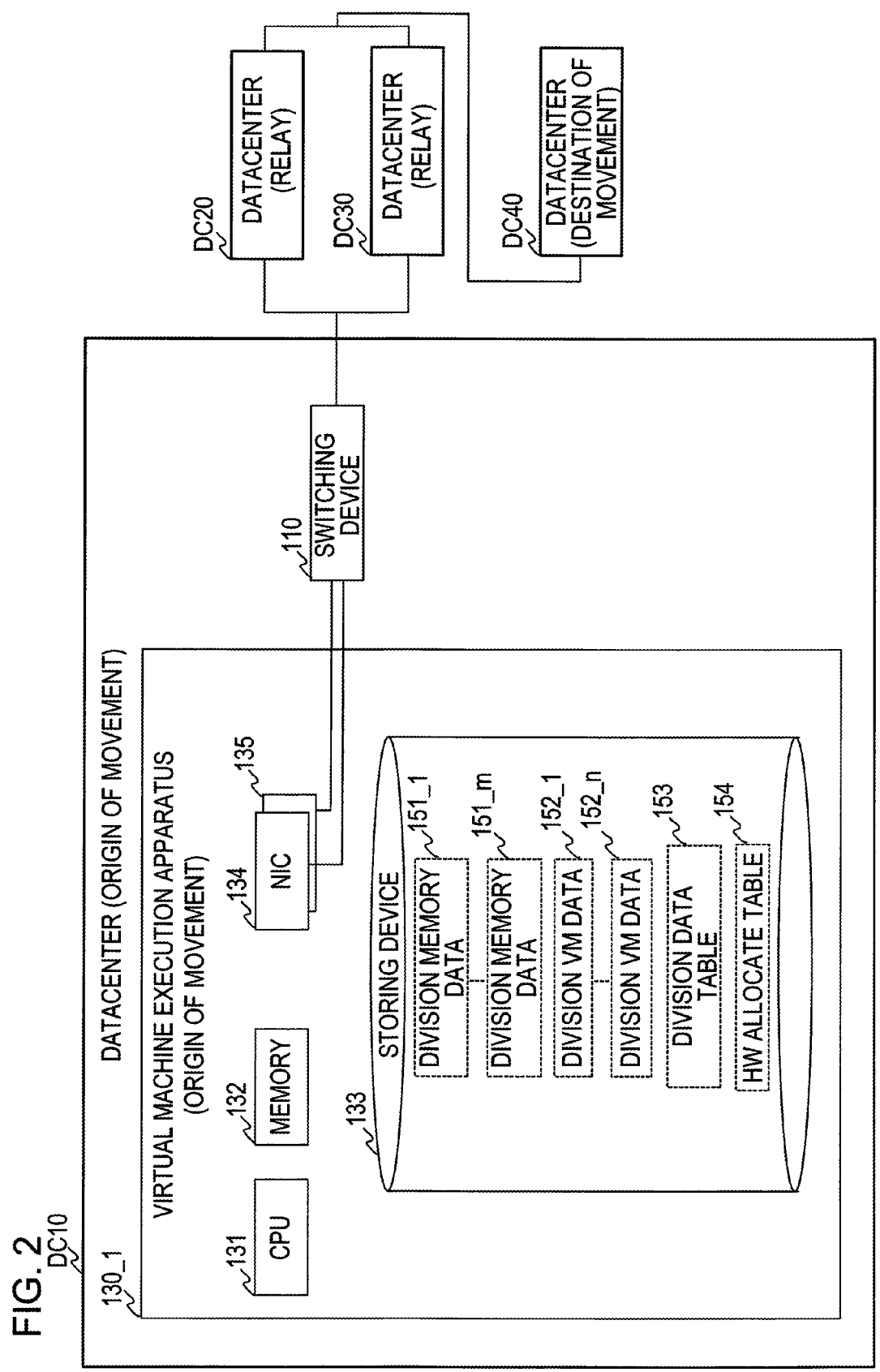
FIG. 2 is a block diagram of the hardware organization of a virtual machine execution apparatus in a data center of the origin of transfer in the first embodiment of FIG. 1.

FIG. 2 is a block diagram illustrating the hardware organization of the virtual machine execution apparatus in the data center of a transfer origin according to the first embodiment in FIG. 1.

Figure 3:
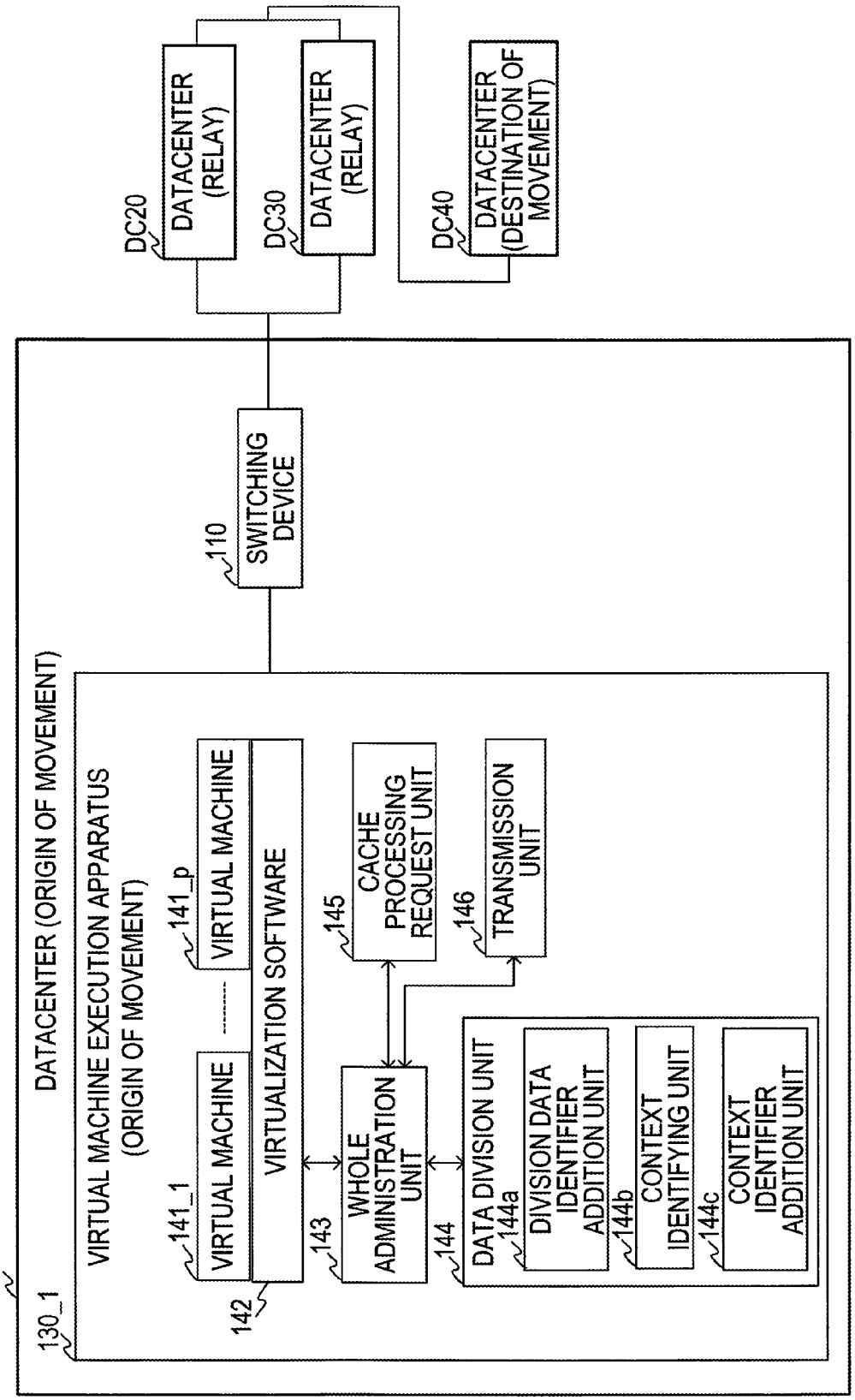
FIG. 3 is a block diagram of the software module of the virtual machine execution apparatus in the data center of the origin of transfer in the first embodiment of FIG. 1.

FIG. 3 is a block diagram illustrating the software module of the virtual machine execution apparatus in the data center of the transfer origin according to the first embodiment in FIG. 1.

In FIG. 2, the virtual machine execution apparatus 130_1 has a CPU (Central Processing Unit) 131, a memory 132, a storing device 133, a first network interface card (below described as NIC) 134 and a second network card (NIC) 135, which are mutually connected through a bus (not illustrated in FIG. 2), for example. As explained in FIG. 1, these NIC 134,135 respectively perform data communications of which applications executes between the virtual machines of the first virtual machine execution apparatus 130_1~the hth virtual machine execution apparatus 130_h, and data communications of monitoring and observation of these virtual machine execution apparatus.

The CPU 131 is a computer which controls the whole virtual machine execution apparatus 130_1. The memory 132 stores various control information and data processed in the variety-of-information processing which the CPU 131 perform, etc. The storing device 133 is a various storing device, a nonvolatile memory, and magnetic-storing device, such as a hard disk drive (HDD). The following explanation illustrates and explains the HDD as the storing device.

The first NIC 134 and the second NIC 135 are constructed by dedicated substrates for performing network communication, and has a function as a data-communications part. In addition, the NIC may be one or three or more.

In the storing device 133, division memory data 151_1~151_m, division VM (Virtual Machine) data 152_1~152_n, a division data table 153, and a HW (Hard Ware) allocate table 154 are not yet stored before the migration of the virtual machine. Each of these data is explained in full detail behind.

In FIG. 3, each of the first virtual machine 141_1~the pth virtual machine 141_p performs information processing by the virtualized hardware. This hardware is the CPU 131, the memory 132, the storing device 133, the first NIC 134, and the second NIC 135 in FIG. 2, for example.

A virtualization software 142 is the infrastructure software which virtualizes the hardware, allocates the virtualized hardware to the first virtual machine 141_1~the pth virtual machine 141_p and operates the first virtual machine 141_1~the pth virtual machine 141_p.

A whole administration unit 143 performs administration of the virtualization software 142, a data division unit 144, a cache processing request unit 145, and the transmission unit 146. The data division unit 144 divides the data relating to the virtual machine for migration per a predetermined data. Hereafter, the data which the data division unit 144 divided is suitably described as division data.

A division data identifier addition unit 144a adds the division data identifier which identifies division data uniquely to this division data. A context identifying unit 144b identifies whether this division data is context data or non-context data. In addition, the context data and non-context data will be explained by below-mentioned FIG. 8 and FIG. 9. A context identifier addition unit 144c adds the identifier which discriminates that the division data is context data or non-context data uniquely to the division data.

The cache processing request unit 145 requests to perform the storage of the division data to the switching devices 110, 210, 310, 410 in each of the data centers DC10, DC20, DC30, and DC40 in the information processing system 1 of FIG. 1. The storing (recording) of this division data is suitably described as cache. In addition, the cache processing request unit 145 may perform this request processing using an SNMP trap (Simple Network Management Protocol trap), for example.

The transmission unit 146 transmits the data for transmission to the switching device 110 using the first NIC 134 and the second NIC 135. The switching device 110 receives the data transmitted from the transmission unit 146, and performs transmission processing of data with reference to the IP address (Internet Protocol Address) of a destination currently stored on the header part of the data for transmission.

Programs which function as the virtualization software 142, the whole administration unit 143, the data division unit 144, the cache processing request unit 145, and the transmission unit 146 are stored in the storing device 133 in FIG. 2, for example. And the CPU 131 operates these programs as a software module by reading these programs from the storing device 133, and developing it in the memory 132 at a start-up.

(Switching Device)

The switching device in the data center DC will be explained based on FIG. 4 and FIG. 5.

Figure 4:
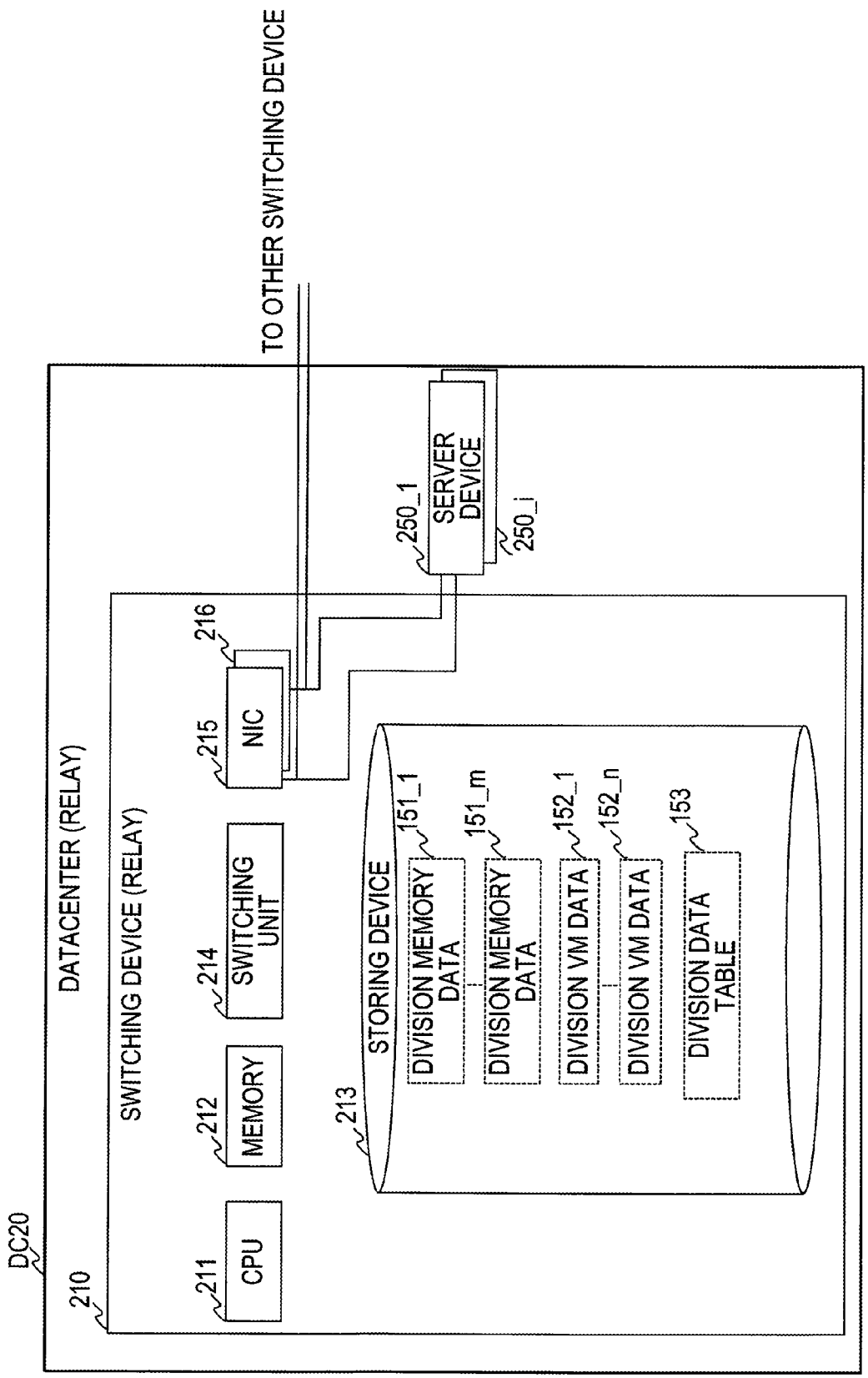
FIG. 4 is a block diagram of the hardware organization of the switching device in the first embodiment of FIG. 1.

FIG. 4 is a block diagram illustrating the hardware construction of the switching device according to the first embodiment in FIG. 1. FIG. 5 is a block diagram illustrating the software module of the switching device according to the first embodiment in FIG. 1.

Figure 5:
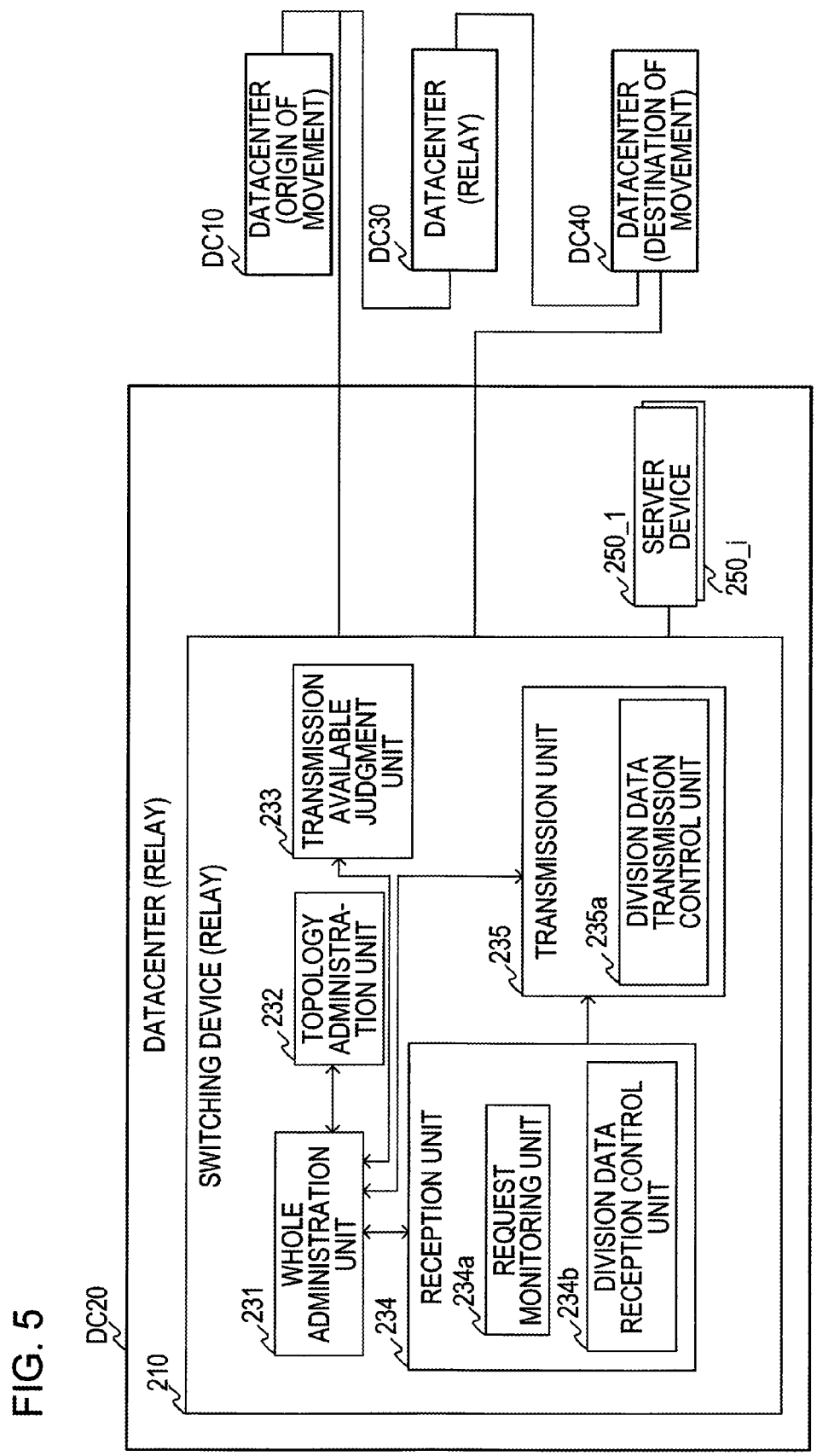
FIG. 5 is a block diagram of the software module of the switching device in the first embodiment of FIG. 1.

In FIG. 4 and FIG. 5, the switching device 210 in the second data center DC20 is illustrated and explained, and other switching device 110, 310, 410 may have the same construction.

In FIG. 4, the switching device 210 has a CPU 211, a memory 212, a storing device 213, a switching unit 214, and a first NIC 215 and a second NIC 216 which are mutually connected through a bus (not illustrated in FIG. 4), for example. In addition, the NIC may be one or three or more.

The CPU 211 is a computer which controls the whole switching device 210. The memory 212 stores the data in the variety-of-information processing of which the CPU executes. The storing device 213 is a storing device, such as a nonvolatile memory and a magnetic-storing device, as explained in FIG. 2. The switching unit 214 performs data relay processing in a network, that is, a switching processing. The first NIC 215 and the second NIC 216 are dedicate substrates for performing network communication, and function as a data-communication unit.

Division memory data 151_1~151_m, division VM data 152_1~152_n, and division data table 153 in the storing device 213 are not yet stored before the migration of the virtual machine.

In FIG. 5, the whole administration unit 231 performs administration of a topology administration unit 232, a transmission available judgment unit 233, a receiving unit 234, and a transmission unit 235.

The topology administration unit 232 manages a connection relation (it is also called a connection construction) between the switching device 210 and other switching device linked to the switching device 210, that is network topology. The transmission available judgment unit 233 judges whether the data can be transmitted to the switching device of a data destination. The receiving unit 234 performs data reception processing. A request monitoring unit 234$a$ in the receiving unit 234 monitors whether there are any various requests, such as a cache request. A division data reception control unit 234$b$ in the receiving unit 234 controls reception processing of division data. The transmission unit 235 performs data transmission processing. A division data transmitting control unit 235$a$ in the transmission unit 235 controls transmission processing of division data.

Programs which function as the whole administration unit 231, the topology administration unit 232, the transmission available judgment unit 233, the receiving unit 234, and the transmission unit 235, are stored in the storing device 213 of FIG. 4, for example. And the CPU 211 operates these programs as a software module by reading these programs from the storing device 213, and developing in the memory 212 at a start-up.

(Virtual Machine Execution Apparatus of the Fourth Data Center DC40)

Using FIG. 6 and FIG. 7, the first virtual machine execution apparatus 430_1 in the fourth data center DC40 which is a destination will be explained. The virtual machine execution apparatus other than the first virtual machine execution apparatus 430_1 in the fourth data center DC40 may also have the same construction as the first virtual machine execution apparatus 430_1.

Figure 6:
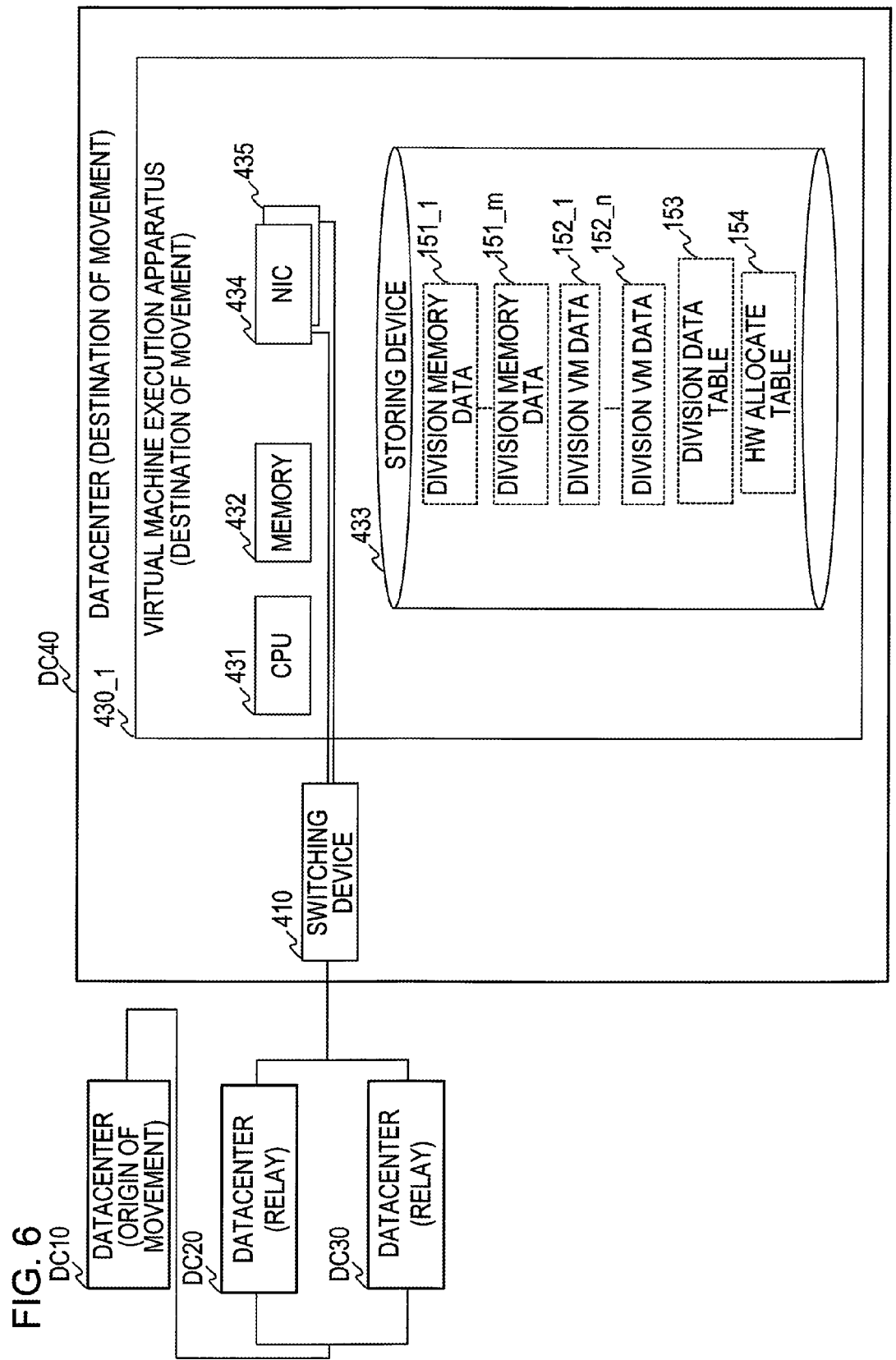
FIG. 6 is a block diagram of the hardware organization of a virtual machine execution apparatus in a data center of the destination in the first embodiment of FIG. 1.

FIG. 6 illustrates a block diagram of the hardware construction of the virtual machine execution apparatus in the fourth data center DC40 which is a destination according to the first embodiment in FIG. 1.

Figure 7:
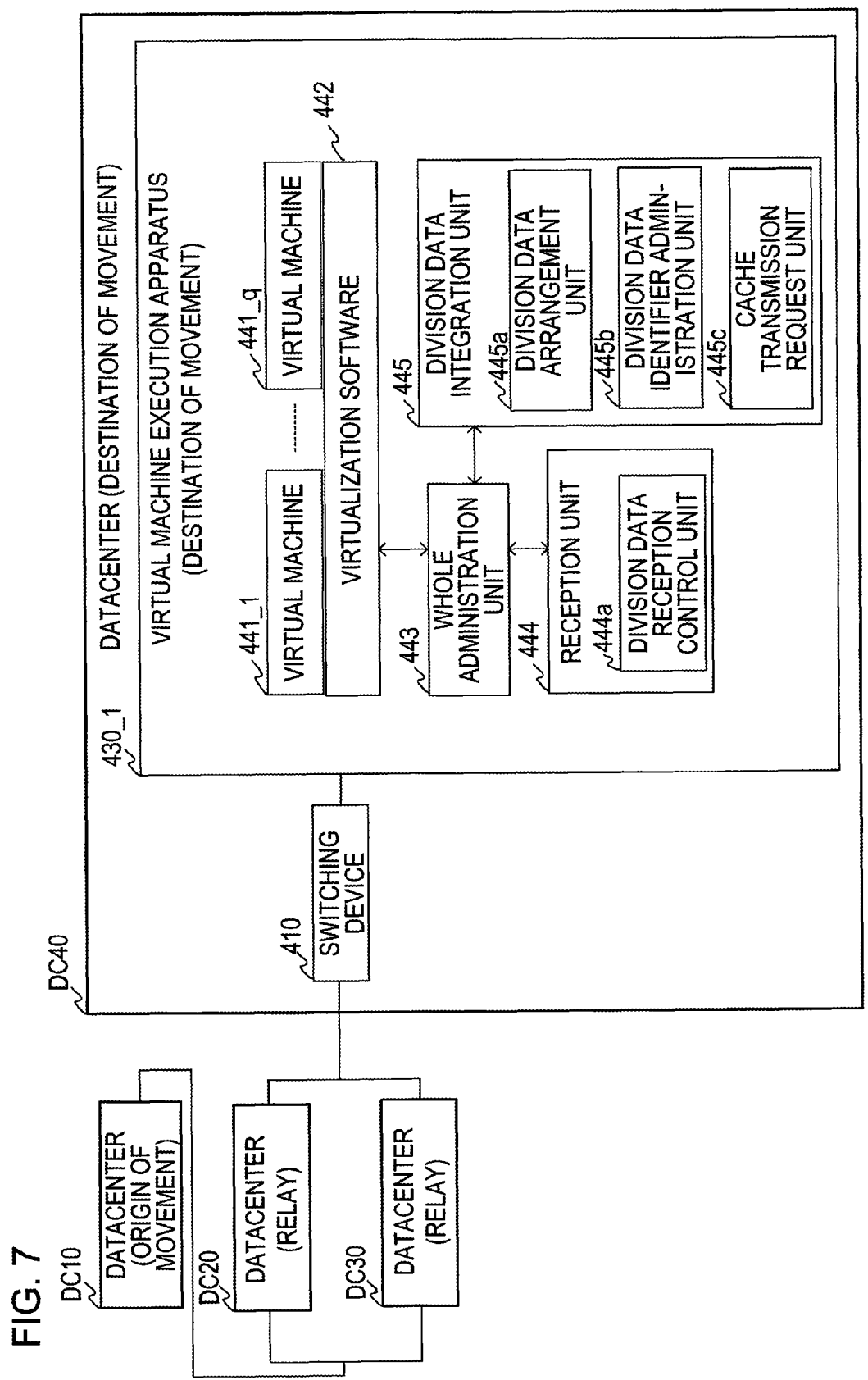
FIG. 7 is a block diagram of the software module of the virtual machine execution apparatus in the data center of the destination in the first embodiment of FIG. 1.

FIG. 7 is a block diagram illustrating the software module of the virtual machine execution apparatus in the fourth data center DC40 which is a destination according to the first embodiment in FIG. 1.

In FIG. 6, the virtual machine execution apparatus 430_1 has a CPU 431, a memory 432, a storing device 433, a first NIC 434 and a second NIC 435, which are mutually connected through a bus (not illustrated in FIG. 6), for example.

The CPU 431 is a computer which controls the whole virtual machine execution apparatus 430_1. The memory 432 stores various control information and data processed in the variety-of-information processing which the CPU 431 performs, etc.

The storing device 433 is a various storing device, a nonvolatile memory, and magnetic-storing device, such as a hard disk drive (HDD). In the storing device 433, division memory data 151_1~151_$m$, division VM (Virtual Machine) data 152_1~152_$n$, a division data table 153, and a HW (Hard Ware) allocate table 154 are not yet stored before the migration of the virtual machine. Each of these data is explained in full detail behind. The following explanation illustrates and explains the HDD as the storing device.

The first NIC 434 and the second NIC 435 are constructed by dedicated substrates for performing network communication, and has a function as a data-communications unit. In addition, the NIC may be one or three or more.

In FIG. 7, each of the first virtual machine 441_1~the qth virtual machine 441_$q$ performs information processing by the virtualized hardware. This hardware is the CPU 431, the memory 432, the storing device 433, the first NIC 434, and the second NIC 435 in FIG. 6, for example.

A virtualization software 442 is the infrastructure software which virtualizes the hardware, allocates the virtualized hardware to the first virtual machine 441_1~the qth virtual machine 441_$q$ and operates the first virtual machine 441_1~the qth virtual machine 441_$q$.

A whole administration unit 443 performs administration of the virtualization software 442, a reception unit 444, and a division data integration unit 446. The reception unit 444 performs reception processing of data. A division data reception control unit 444$a$ in the reception unit 444 controls reception processing of the division data. The division data integration unit 445 integrates the division data of the virtual machine for the migration target of which the receiving unit 444 receives. A division data arrangement unit 445$a$ relocates the division data based on the identifier of the received division data. A division data identifier administration unit 445$b$ manages the identifier of the received division data, and checks the existence of the division data which has not been received. A cache transmission request unit 445$c$ requests transmission of the division data which has not been received to all the switching device in the information processing system.

(Preparation Processing of the Migration)

The migration processing according to the present embodiment will be explained as follows. In the following explanation, the virtual machine execution apparatus 130_1 depicted by FIG. 3 migrates the virtual machine 141_1 to the virtual machine execution apparatus 430_1 in the fourth data center DC40 (referring to FIG. 7) as example.

For migration processing, the virtual machine execution apparatus 130_1 performs creation process of the division data. Using FIG. 8, the creation process of the division data will be explained according to FIG. 3.

Figure 8:
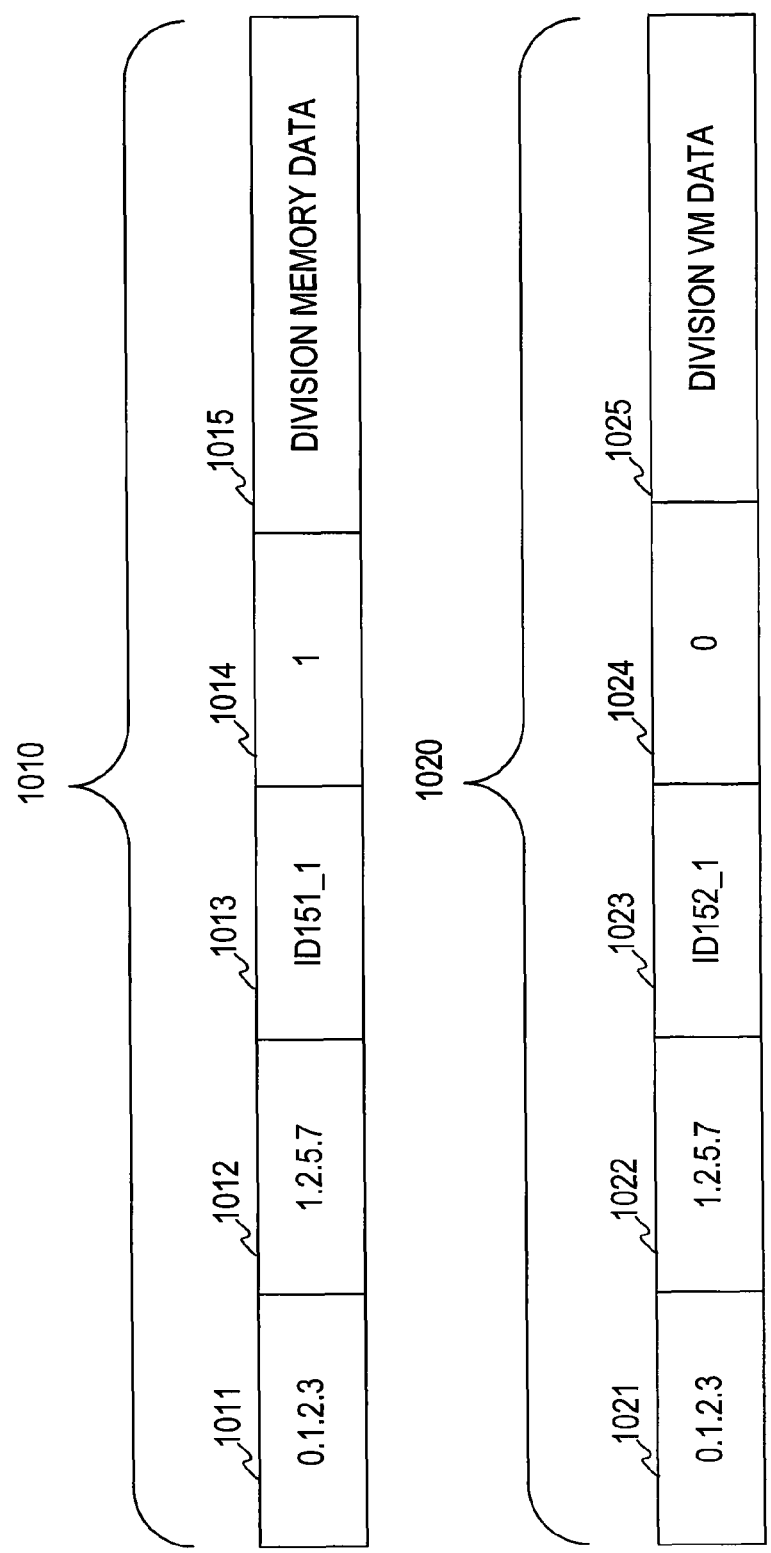
FIG. 8 is a diagram of division data which is added a variety of information as explained in FIG. 3.

FIG. 8 is a schematically diagram depicting the division data in which various information is added and is explained by FIG. 3.

It is assumed that the virtual machine 141_1 in FIG. 3 really performs various information processing. For example, the virtual machine 141_1 executes an information processing program and stores the data such as the operation results, which are obtained by the information processing program, in the memory 132 (referring to FIG. 2) at any time.

Here, a manager instructs to the virtual machine execution apparatus 130_1 through an operation unit (not illustrated in FIG. 3) so as to migrate the virtual machine, of which the virtual machine execution apparatus 130_1 executes, from the virtual machine execution apparatus 130_1 to the virtual machine execution apparatus 430_1 in the fourth data center DC40 (referring to FIG. 1). In other words, the manager performs the movement instructions of the virtual machine to the virtual machine execution apparatus 130_1 through the operation unit.

The whole administration unit 143 in FIG. 3 instructs the division of the data relating to the virtual machine for the migration target to the data division unit 144 in response to the instruction from the operation unit.

Here, the data relating to the virtual machine for the migration target will be explained. These data have two kinds of data.

The first kind of data is first data relating to the information processing that the virtual machine for the migration target is carrying out. In other words, the first data are really stored data in a domain of the memory 132 (referring to FIG. 2) assigned to the virtual machine for the migration target. For example, the first data are a variable and stack of this information processing program that is stored in the above memory area when the virtual machine for the migration target executes the above information processing program. Below, the first data is described as context data appropriately.

The second kind of data is second data which are not related to the information processing that the virtual machine for the migration target is carrying out. In other words, the second data are data except the context data stored in the domain of the memory 132 assigned to the virtual machine for the migration target. Besides, the second data are data stored in the domain of the storing device 133 assigned to the virtual machine for the migration target. For example, the second data are application (called as software) that the virtual machine for the migration target carries out and setting information (called as configuration data) of the application and the hardware. Below, the second data is described as non-context data appropriately.

The data division unit 144 divides the data relating to the virtual machine for the migration target by a predetermined data unit in response to the division instruction of data from the whole administration unit 143. For example, the predetermined data unit is constant length data size or the data size that is most suitable for the data communication. In the following description, the predetermined data unit is 10 M(Mega) byte, for example.

The division data identifier addition unit 144*a* in the data division unit 144 adds a division data identifier to distinguish the division data uniquely to this division data.

And, the context identification unit 144*b* identifies whether this division data is the context data or the non-context data. Furthermore, the context identifier addition unit 144*c* adds the context identifier, which indicates that this division data is the context data or the non-context data, to this division data. Specifically, the context identifier addition unit 144*c* adds "1" to this division data, when the division data is the context data. The context identifier addition unit 144*c* adds "0" to this division data, when the division data is the non-context data.

And the data division unit 144 adds a first identifier to distinguish the virtual machine execution apparatus 410_1 which is a origin of the movement and a second identifier to distinguish the virtual machine execution apparatus 430_1 of the destination. For example, the first identifier, which distinguish the virtual machine execution apparatus 410_1 which is the origin of the movement, is an IP address of the virtual machine execution apparatus 410_1 which is the origin of the movement, and the second identifier, which distinguish the virtual machine execution apparatus 430_1 of the destination is an IP address of the virtual machine execution apparatus 430_1 of the destination.

The division data of which the above identifier was added to is the division data for the transmission target (division data for the migration target).

In addition, the division data, which was stored in the domain of the memory 132 (referring to FIG. 2) assigned to the virtual machine for the migration target, is described with division memory data appropriately. In addition, the division data, which was stored in the domain of the storing device 133 assigned to the virtual machine for the migration target is described with division VM data appropriately.

In FIG. 8, a mark 1010 schematically indicates the state that the above identifier is added to the division memory data. The data division unit 144 adds the IP address "0.1.2.3" of the virtual machine 140_1 of the origin of the movement, which is indicated by the mark 1011, and the IP address "1.2.5.7" of the virtual machine execution apparatus 430_1 of the destination, which is indicated by mark 1012, to the division memory data which is indicated by the mark 1015. The division data identifier addition unit 144*a* adds the division data identifier "ID151_1" which is indicated by the mark 1013 to the division memory data which is indicated by the mark 1015, and the context identification unit 144*b* adds the context identifier "1" (=context data) which is indicated by the mark 1014 to the division memory data which is indicated by the mark 1015.

A mark 1020 schematically indicates the state that the above identifier is added to the division VM data.

The data division unit 144 adds the IP address "0.1.2.3" of the virtual machine 140_1 of the origin of the movement, which is indicated by the mark 1012, and the IP address "1.2.5.7" of the virtual machine execution apparatus 430_1 of the destination, which is indicated by mark 1022, to the division VM data which is indicated by the mark 1025. The division data identifier addition unit 144*a* adds the division VM data identifier "ID152_1" which is indicated by the mark 1023 to the division VM data which is indicated by the mark 1025, and the context identification unit 144*b* adds the context identifier "0" (=non-context data) which is indicated by the mark 1024 to the division VM data which is indicated by the mark 1025.

The data division unit 144 divides the data relating to the virtual machine 141_1 for the migration target by a predetermined data unit adds an identifier to the division data, as described above. And, as indicating by FIG. 2, the data division unit 144 stores the division memory data 151_1-151_*m* and the division VM data 152_1-152_*n* which are added the identifiers in the storing device 133.

FIG. 9 is a example diagram of a table storing various information relating to the division data which is explained by FIG. 3.

The whole administration unit 143 in FIG. 3 creates the division data table 153 of FIG. 9 and stores it in the storing device 133 (referring to FIG. 2) with the division instruction of data for the data division unit 144. The division data table 153 of FIG. 9 has an IP address column of the origin of movement, an IP address column of the destination of the movement, a division data information column and a size column. The division data information column has an identifier column and a context identifier column. The division data table 153 is the identifier storing table which is stored the division data identifier to distinguish the division data.

The data division unit 144 respectively stores the IP address "0.1.2.3" of the virtual machine 140_1 of the origin of movement and the IP address "1,2,5,7" of the virtual machine execution apparatus 430_1 of the destination of the movement, which are added to the division data, in the IP address column of the origin of movement and the IP address column of the destination of the movement in the division data table 153. The division data identifier addition unit 144*a* stores the division data identifier, which is added to this division data, in the identifier column in the division data table 153. Furthermore, the context identifier addition unit 144*c* stores the context identifier, which is added to this division data, in the context identifier column of the division data table 153. Furthermore, the whole administration unit 143 stores the data size of this division data in the data size column of the division data table 153.

By the storage process of the division data table 153 as described above, the IP address (0.1.2.3) of the origin of movement, the IP address (1.2.5.7) of the destination of the movement, the identifier (ID151_1-ID151*m*, ID152_1-ID152_*n*), the context identifier (1 or 0) and the data size (10 Mbyte) for every division data are stored to the division data table 153.

When the switching devices 210, 310, 410 (referring to FIG. 1) in each datacenter DC20, DC30, DC40 performs the storage process of the division data, the division data table 153 is referred to. Besides, the division data table 153 is referred to, when confirming the division data that the virtual machine execution apparatus 430_1 of the destination of the movement does not yet receive in all division data of the virtual machine 140_1 for the migration target.

The whole administration unit 143 of FIG. 3 stores quantity of resources of the hardware of which the virtualization software 142 assigns to the virtual machine 141_1 for the migration target in the storing device 133 (referring to FIG. 2), as a table form, for example. Here, the hardware assigned to the virtual machine 141_1 is the CPU 131, the memory 132, the storing device 133 that is the HDD, the first NIC 134, and the second NIC 135, in the example of FIG. 2. In addition, the quantity of resources of the hardware assigned to the virtual machine 141_1 is a performance (specification) of these hardware resources, namely, available quantity of clocks of the CPU 131, available quantity of the memory 132, available quantity of the storing device 133, available band width of the first NIC 134 and the second NIC 135.

FIG. 10 is an example diagram of a table storing the quantity of the hardware resources assigned to the virtual machine which is explained by FIG. 3.

The HW table 154 has an allotment clock speed column, quantity of allotment memory, quantity of allotment HDD and an allotment network band column. The allotment clock speed column is stored the clock speed of a CPU assigned to the virtual machine, and the quantity of allotment memory is stored capacity of the memory (domain of the memory) assigned to the virtual machine. The quantity of allotment HDD column is stored the capacity of the HDD assigned to the virtual machine, and the allotment network band column is stored the bandwidth of a communication network assigned to the virtual machine.

The whole administration unit 143 of FIG. 3 stores the clock speed of the CPU with 2.0 GHz, the quantity of the memory with 2 GB and the HDD capacity with 100 GB and the network band with 1 Gbps, which are assigned to the virtual machine 141_1 for the migration target, in the HW allotment table of FIG. 10.

(Transmission Processing to the Fourth Datacenter DC40 of the Destination of the Movement)

As described in FIG. 3, after the completion of the division process of the data relating to the virtual machine for the migration target, the whole administration unit 143 carries out the following processing. In other words, the whole administration unit 143 instructs the transmission of the division data table 153 and the HW allotment table 154 to the virtual machine execution apparatus 430_1 in the fourth datacenter DC40 of the destination of the movement to the transmission unit 146.

The transmission unit 146 transmits the division data table 153 and the HW allotment table 154 to the virtual machine execution apparatus 430_1 in the fourth datacenter DC40 of the destination of the movement in FIG. 7, in response to this transmission instruction. Because there is little quantity of data such as the division data table 153 and the HW allotment table 154, the data is transmitted to the virtual machine execution apparatus 430_1 immediately.

When the reception unit 444 in the virtual machine execution apparatus 430_1 of FIG. 7 receives the division data table 153 and the HW allotment table 154, the reception unit 444 outputs these data to the whole administration unit 443. The whole administration unit 443 stores the division data table 153 and the HW allotment table 154 in the storing device 433 (referring to FIG. 6) in response to this output.

And the whole administration 443 instructs the virtualization software 442 to build the virtual machine based on the HW allotment table 154. The virtualization software 442 carries out processing to build the virtual machine which is assigned the quantity of the hardware resources stored in the HW allotment table 154 in response to the instruction. For example, here, the virtualization software 442 builds a virtual machine 441_$q$.

Then, the cache request and the transmission of the division data will be explained based on FIG. 1-FIG. 3.

For example, the whole administration unit 143 in FIG. 3 instructs the cache processing request unit 145 to perform a cache request the at the start time of creation of the above division data, during the creation and end time of the creation.

The cache processing request unit 145 executes the cache request of the division data to the switching devices 110, 210, 310, 410 (referring to FIG. 1) and transmits the division data table 153 in FIG. 9 in response to this cash request instruction.

Then, the whole administration unit 143 in FIG. 3 begins to read the division memory data 151_1-151_$m$ and the division VM data 152_1-152_$n$ which are the division data, and outputs it to the transmission unit 146. At this time, the whole administration unit 143 preferentially reads the division data of which the context identifier is "1", that is, the division data which is context data and outputs it to transmission unit 146. And the whole administration unit 143 instructs to the transmission unit 146 to transmit it to the virtual machine execution apparatus 430_1 in the fourth datacenter DC40 of the destination of the movement.

The transmission unit 146 sequentially transmits the division data of which the whole administration unit 143 output to the switching device 110 through the first NIC 134 and the second NIC 135. The transmission unit 146 carries out the transmission process of the division data quickly by transmitting the division data through two NICs.

As explained, the transmission unit 146 preferentially transmits the division data which are context data to (than) the division data which are non-context data. Because the transmission unit 146 preferentially transmits the division data which are context data, it is possible that the virtual machine which is migrated quickly carries out the information processing in the virtual machine execution apparatus 430_1 (referring to FIG. 7) of the destination of the movement.

In addition, the virtual machine execution apparatus 130_1 in FIG. 3 transmitted the division memory data 151_1-151_$m$ and the division VM data 152_1-152_$n$ in the storing device 133 (referring to FIG. 2) in a lump, when completing of the creation process of all division data of the virtual machine 140_1 for the migration target. This reason is that the creation of the division data table 131 in FIG. 9 has finished after the creation process of all division data in the virtual machine execution apparatus 130_1 was completed, because the whole administration unit 143 in the virtual machine execution apparatus 130_1 of FIG. 2 creates the division data while creating the division data table 131 of FIG. 9.

(Cache Request, the Reception of the Division Data Table)

The cache request and the reception process of division data table will be explained based on FIG. 1, and FIG. 3~FIG. 5.

In FIG. 3, the switching device 110, which received cache request and the division data table 153 from the virtual machine execution apparatus 130_1, transmits this cache request instructions and the division data table 153 to the switching device 210 in the second datacenter DC20, the switching device 310 in the third datacenter DC30, and the switching device 410 in the fourth datacenter DC40 of FIG. 1. When the switching devices 110, 210, 310, 410 of each datacenters DC10, DC20, DC30, DC40 receive the cache request and the division data table 153, the switching devices 110, 210, 310, 410 store the division data table 153 in the storing device in the own device.

The reception of the cache request and the storing process of the division data table 153 will be explained as exemplifying the switching device 210 of FIG. 5.

The reception unit 234 in the switching device 210 receives the cache request and the division data table 153. At this time, the request monitoring unit 234a always monitors the reception of the cache request. When the reception unit 234 receives the cache request, the request monitoring unit 234a notifies to the whole administration unit 231 to receive the cache request. The whole administration unit 231 stores the division data table 153 of which the reception unit 234 received in the storing device 213 (referring to FIG. 4) in response to the notice.

The other switching devices 110, 310, 410 (referring to FIG. 1) also carry out the storing process of the division data table 153, as explained.

(Cache Processing of the Division Data)

Based on FIG. 1, FIG. 3-FIG. 5, the cache processing of division data will be explained. In the following explanation, a case, that a bottleneck of the data communication occurs between the switching device 110 and the switching device 310 in FIG. 1, is explained. Furthermore, a bottleneck of the data communication occurs between the switching device 210 and the switching device 410. For a cause of this bottleneck occurrence, there is a case that a network band between the switching device 110 and the switching device 310, or the network band between the switching device 210 and the switching device 410 decreases for some kind of causes, for example. Besides, because a large quantity of data communication processing is carried out between the switching device 310 and the switching device 410, as a result, there is a case that processing loads of the switching device 310 and the switching device 410 increase.

Under this situation, the switching device 110 in the first datacenter DC10 transfers the division data which is transmitted by the virtual machine execution apparatus 130_1 to the switching device 210 of the second datacenter DC20. The reason why the switching device 110 does not transfer this division data to the switching device 310 of the third datacenter DC30 is that a bottleneck of the data communication occurs between the switching device 110 and the switching device 310 as described above.

The transmission available judgment unit 233 in the switching device 210 of FIG. 5 judges whether it is available to transfer the division data transmitted from the switching device 110 (referring to FIG. 1) to the switching device 410 (referring to FIG. 1) of the transmission destination.

For the judgment, the transmission available judgment unit 233 transmits a confirmation signal to inquire whether the transmission of the division data is available, in other words, whether the switching device of the destination of the data is available to receive the division data, for example. The switching device of the destination of data, when the reception of the division data is available, replies an acknowledgement (ACK: ACKnowledgement) in response to this confirmation signal. On the other hand, the switching device of the destination of data, when the reception of the division data is not available, replies a negative acknowledgement (NACK: Negative ACKnowledgement) in response to this confirmation signal.

A situation that the switching device of the destination of data is available to receive the division data is a situation that a margin of the information processing amount of the switching device is less than a predetermined processing amount, for example. Another situation is a situation that the use bandwidth of the switching device in network bandwidth is less than a predetermined bandwidth. In these cases, the switching device of the transmission destination replies the acknowledgment.

On the other hand, a situation that the switching device of the destination of data is not available to receive the division data is a situation that the margin of the information processing amount of the switching device is more than the predetermined processing amount, for example. Another situation is a situation that the use bandwidth of the switching device in network bandwidth is more than the predetermined bandwidth. In these cases, the switching device of the transmission destination replies the negative acknowledgment.

In addition the transmission available judgment unit 233 may detect the use bandwidth of the network which connects to the switching device of the destination of the data, and detect that the use bandwidth is more than the predetermined bandwidth. The transmission available judgment unit 233 judges that the transmission of the division data to the switching device of the destination of data is available, when the network bandwidth is more than the predetermined bandwidth. On the other hand, the transmission available judgment unit 233 judges that the transmission of the division data to the switching device of the destination of data is not available, when the network bandwidth is less than the predetermined bandwidth.

When the transmission available judgment unit 233 judges that the transmission of the division data to the switching device of the destination of data is not available, the whole administration unit 231 instructs to the division data reception control unit 234b to store the division data received by the reception unit 234 in the storing device 213 (referring to FIG. 4). The division data reception control unit 234b stores this division data in the storing device 213 in response to this storing instruction. In addition, the division data reception control unit 234b stores the division data having the identifier of the division data, which is stored in the division data table 153 of FIG. 9, in the storing device 213 by referring to the identifier of the division data which the reception unit 234 received. The division data reception control unit 234b stores only the division data in conjunction with the virtual machine for the migration target without carrying out the storing process of unnecessary data by this storing processing.

The division data reception control unit 234b stores the division memory data 151_1-151_m, the division VM data 152_1-152_n in the storing device 213 (referring to FIG. 4) as the division data which is received by the above storing processing.

Furthermore, the whole administration unit 231 stores data relating to the division data which is cached in the storing device 213 as a table form, for example. The data relating to the division data are each data which is stored in the division data table 153 of FIG. 9. Specifically, the data is the IP addresses of movement origin and the movement destination of the division data, the identifier of the division data, the context identifier of the division data and the data size of the division data. In the case of the above example, the whole administration unit 231 stores a table same as the division data table 153 of FIG. 9.

In addition, when the transmission available judgment unit 233 judges that the transmission of the division data to the switching device of the destination of data is available, the whole administration unit 231 instructs to the division data reception control unit 234b to output the division data received by the reception unit 234 to the transmission unit 235. The division data reception control unit 234b outputs this division data to the transmission unit 235 in response to this output instruction. The division data transmission control unit 235a in the transmission unit 235 sequentially transmits the input division data to the switching device of the transmission destination.

(Transmission Process of Division Data which is Cached)

Based on FIG. 4 and FIG. 5, the transmission process of division data which is cached will be explained.

The whole administration unit 231 in the switching device 210 of FIG. 5 determines whether the division data is stored in the storing device 213 of FIG. 4.

When the transmission available judgment department 233 of FIG. 5 determines that the division data is stored in the storing device 213 of FIG. 4, the transmission available judgment department 233 inquires to the switching device of the data destination whether the transmission of the data is available at every predetermined interval. It is possible that the predetermined interval optionally changes one minute or ten minutes, for example. Besides, the transmission available judgment unit 233 may carry out the above inquiry when the cache transmission request unit 445c of FIG. 7 performs transmission request of the division data which is cached and the request monitoring unit 234a of FIG. 5 receives this transmission request.

At this time, when the bottleneck of the network between the switching device 210 in the second datacenter DC20 and the switching device 410 in the fourth datacenter DC40 is canceled, the transmission available judgment unit 233 judges that it is available to transmit the division data to the switching device of the transmission destination of the data.

When the transmission available judgment unit 233 of FIG. 5 judges that the transmission of the division data to the switching device of the destination of data is available, the transmission available judgment unit 233 notifies the judgment to the whole administration unit 231. The whole administration unit 231 instructs to the transmission unit 235 to transmit the division data stored in the storing device 213 of FIG. 4. The division data transmission control unit 235a in the transmission unit 235 sequentially transmits the division data to the switching device of the transmission destination from the division data that the division data in which the context identifier is "1" and the division data identifier is small in response to this transmission instruction. As above described, the division transmission control unit 235a preferentially transmits the division data which are context data to (than) the division data which are non-context data among the division data stored in the storing device 213.

When the division data transmission control unit 235a completes the transmission process of the division data of which the context identifier is "1", the division data transmission control unit 235a sequentially transmits the division data to the switching device of the transmission destination from the division data that the division data in which the context identifier is "0" and the division data identifier is small. In addition, in the transmission process of the division data, the whole administration unit 231 stores the identifier of the division data which is transmitted in the storing device 213 (referring to FIG. 4). And the whole administration unit 231 deletes the division data table 153 in the storing device 213 when all the division data, which have the identifier of the division data that is transmitted, in the storing device 213 are transmitted.

In the example of the storing unit 213 of FIG. 4, the division data transmission control unit 235a transmits the division data to the switching device 410 in the fourth datacenter DC40 in order of the division memory data 151_1-151_m, and the division VM data 152_1-152_n.

By the above mentioned transmission process of the division data, the switching device 410 in the fourth datacenter DC40 receives the division data sequentially.

(Process in the Datacenter of the Movement Destination)

Based on FIG. 1, FIG. 6, and FIG. 7, the process carried out in the fourth datacenter DC40 of the movement destination will be explained.

In FIG. 1, the switching device 410 in the fourth datacenter DC40 receives division data transmitted from the switching device 210 in the second datacenter DC20 and transfers it to the virtual machine execution apparatus 430_1.

The division data reception control unit 444a in the reception unit 444 of FIG. 7 stores the division data of which the reception unit 444 received in the storing device 433 of FIG. 6. The division data reception control unit 444a stores the division memory data 151_1-151_m and the division VM data 152_1-152_n in the storing device 433 as the division data which are received by the above storing process.

And the division data identifier administration unit 445b refers to the identifier of the division data stored in the storing device 433 and the identifier column of the division data table in the storing device 433 and confirms whether the division data which is not still stored in the storing device 433, that is, the division data which is not still received. The cache transmission request unit 445c, when there is the division data which is not still received, requests to the switching device 110, 210, 310, 410 (referring to FIG. 1) in the information system 1 to transmit the division data by appointing the identifier of this division data. Below, this request is described with a cash transmission request appropriately.

In the case of the above example, the switching device 210 of FIG. 5 carried out the cache process of the division data. Therefore, when the request monitoring unit 234a in the switching device 210 receives this cash transmission request, the transmission available judgment unit 233 inquires whether it is available to transmit the data to the switching device of the destination of data at every predetermined interval. And when the transmission available judgment unit 233 determines that the transmission is available, the transmission control unit 235a in the transmission unit 235 carries out the transmission processing of the division data which is cached.

By the way, the whole administration unit 443 instructs to the division data integration unit 445 to integrate the division data in the storing device 433 (referring to FIG. 6) in the reception and storage process of this division data. The division data allotment unit 445a in the division data integration unit 445 relocates the division data in the storing unit 433 based on the identifier of the division data which is received.

And the division data allotment unit 445a develops data in which the context identifier indicates "1", namely context data, among the division memory data 151_1-151_m in the storing device 433 (referring to FIG. 6), in the domain of the memory 432 (referring to FIG. 6) assigned to the virtual machine 441_q as priority.

Then, the division data allotment unit 445a develops data in which the context identifier indicates "0", namely non context data, among the division memory data 151_1-151_m in the storing device 433 (referring to FIG. 6), in the domain of the memory 432 (referring to FIG. 6) assigned to the virtual machine 441_q.

Then, the whole administration unit 443 instructs the virtualization software 441_q to carry out the virtual machine 441_q based on the division memory data developed in this memory 432 and the division VM data in the storing device 433.

As a result, a virtual machine, which is a same virtual machine (the virtual machine 441_q of FIG. 7) as the virtual machine 140_1 which carried out in the virtual machine execution apparatus 130_1 of the origin of movement, operates in the virtual machine execution apparatus 430_1 of the destination of the movement while continuing contents of the information processing that the virtual machine 140_1 carried out before the migration. This is because the context data of the virtual machine 140_1, which carried out in the virtual machine execution apparatus 130_1 of the origin of movement, are developed in the memory 432 of the virtual machine execution apparatus 430_1 of the destination of the movement.

In addition, the division data allotment unit 445a in the virtual machine execution apparatus 430_1 of the destination developed the context data in the domain of the memory 432 (referring to FIG. 6) assigned to the virtual machine 441_q as priority. It is much time to carry out the development process because it is necessary that the division data allotment unit 445a reads the context data from the storing device 433 (referring to FIG. 6).

However, because the context data are preferentially transmitted as above described, it is possible that the division data reception control unit 444a receives the context data with precedence and stores it in the storing device 433 (referring to FIG. 6). Therefore it is possible that the division data allotment unit 445a reads the context data which have been already stored in the storing device 433, and develops it to the domain (domain assigned to the virtual machine 441_q) of the memory 432, while the division data reception control unit 444a receives the non-context data, e.g., the division VM data 152_1-152_n and stores it in the storing device 433, In other words, it is possible that the division data allotment unit 445a reads the context data in the storing device 433, e.g., the division memory data 151_1 in the memory 432 in advance. As a result, it is possible to quickly operate the virtual machine 441_q as same as the virtual machine 140_1 which is carried out in the virtual machine execution apparatus 130_1 of the origin of movement.

In addition, in the timing when the virtual machine 441_q operates, the whole administration unit 431 in the virtual machine execution apparatus 430_1 of the destination of the movement may request a cache clear to all switching devices 110, 210, 310, 410 (referring to FIG. 1). The switching devices 110, 210, 310, 410 delete (clear) the division data the division data table, which were cached, from the storing device in response to this cache clear request.

(Flow of the Migration Process to Carry Out in the Virtual Machine Execution Apparatus 130_1 of the Origin of Movement)

Figure 11:
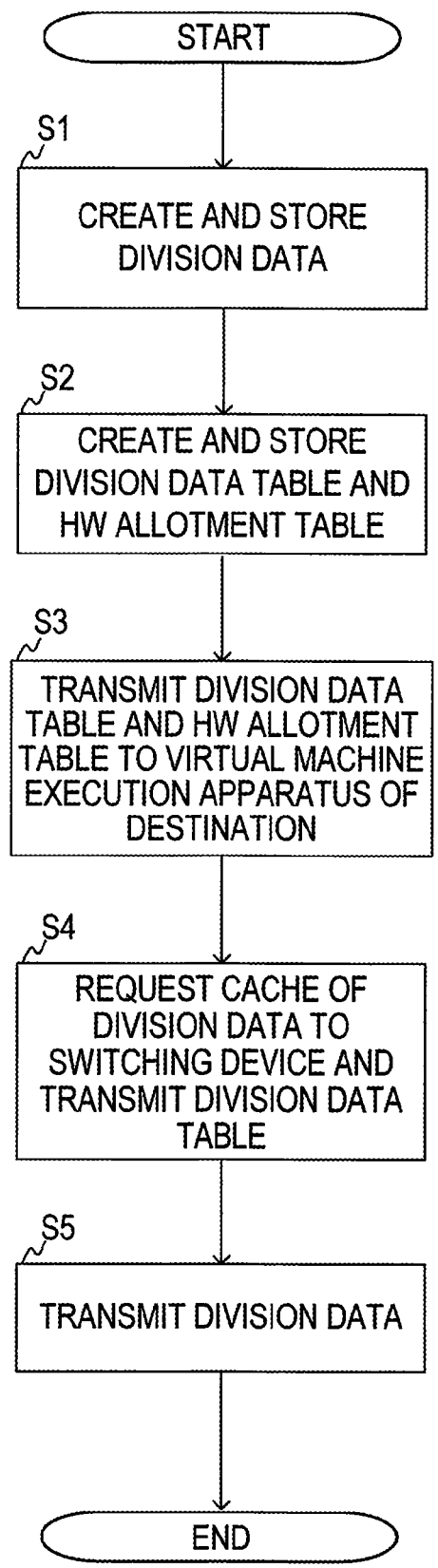
FIG. 11 is a flow diagram explaining an example of the flow of the migration processing of which the virtual machine execution apparatus of the origin of transfer performs.

FIG. 11 is a flow diagram to explain an example of the flow of the migration process of which the virtual machine execution apparatus 130_1 of the origin of movement in FIG. 3 carries out. In addition, the virtual machine execution apparatus 130_1 determines that the virtual machine 141_1 is a virtual machine for the migration target as illustrated by FIG. 3.

Step S1: The division data unit 144 of FIG. 3 creates the division data of the virtual machine 141_1 and stores the data division in the storing device 133 of FIG. 2. Specifically, the data division unit 144 divides data in conjunction with the virtual machine 141_1 for the migration target by a predetermined data unit. And the data division unit 144 adds an IP address of virtual machine 140_1 of the origin of movement and an IP address of the virtual machine execution apparatus device 430_1 of the destination of the movement to the division data. Furthermore, the division data identifier addition unit 144a adds a division data identifier to this division data, and the context identification unit 144b adds the context identifier to this division data.

Step S2: The whole administration unit 143 of FIG. 3 crates the division data table 153 of FIG. 9 and stores it in the storing device 133 (referring to FIG. 2). Furthermore, the whole administration unit 143 of FIG. 3 creates the HW allotment table of FIG. 10 and stores it in the storing device 133 (referring to FIG. 2).

Step S3: The transmission unit 146 of FIG. 3 transmits the division data table 153 and the HW allotment table 154 to the virtual machine execution apparatus 430_1 in the fourth datacenter DC40 of the destination of the movement of FIG. 7.

Step S4: The cache processing request unit of FIG. 3 requests the cache of the division data to the switching devices 110, 210, 310, 410 (referring to FIG. 1) and transmits the division data table 153 of FIG. 9. In addition, the switching devices 110, 210, 310, 410 stores the division data table 153 in the storing device in the own device as described by FIG. 3 and FIG. 5.

Step S5: The transmission unit 146 of FIG. 3 transmits the division data to the switching device 110 sequentially through the first NIC 134 and the second NIC 135 (referring to FIG. 2).

(A Flow of Cache Processing of Division Data and the Transmission Processing)

Figure 12:
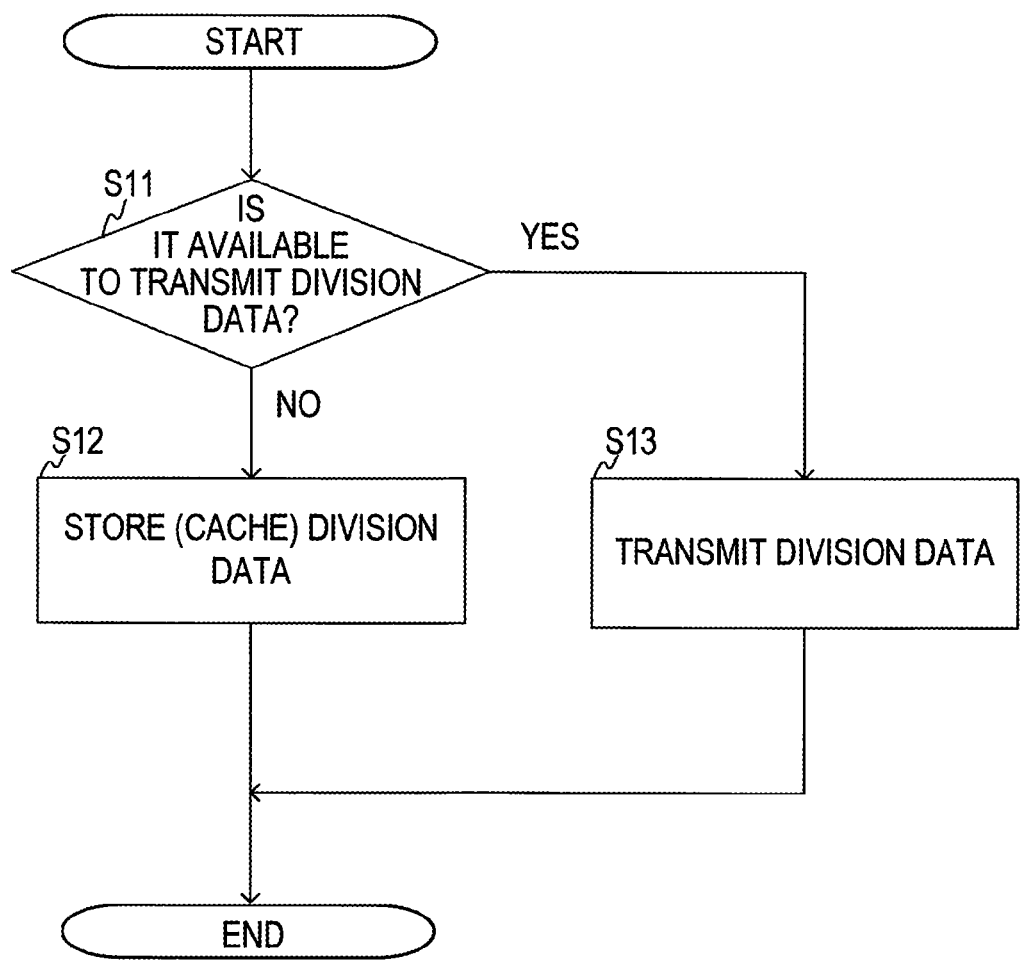
FIG. 12 is a flow diagram explaining an example of the flow of the cash processing of which the switching device in FIG. 5 performs.

FIG. 12 is a flow diagram to explain an example of the flow of the cache processing that the switching device of FIG. 5 carries out. This processing flow, for example, is carried out whenever the reception unit 234 of FIG. 5 receives division data.

Step S11: The transmission available judgment unit 233 in the switching device 210 of FIG. 5 judges whether the transmission of the division data, which is transmitted from the switching device 110 (referring to FIG. 1), to the switching device 410 (referring to FIG. 1) of the transmission destination is available.

When the transmission available judgment unit 233 determines that the transmission is not available (that is, step S11/NO), the process moves the step S12.

Step S12: The division data reception control unit 234b of FIG. 5 caches the division data of which the reception unit 234 received in the storing device 213 (referring to FIG. 4). In addition, the whole administration unit 231 stores data relating to the division data which cached in the storing device 213 as a table form, for example.

When the transmission available judgment unit 233 determines that the transmission is available (that is, step S11/YES), the process moves the step S13.

Step S13: the division data transmission control unit 235b in the transmission unit 235 transmits the division data of which the reception unit 234 received to the switching device of the transmission destination sequentially.

(Flow of the Transmission Process of Division Data which Did a Cache)

Figure 13:
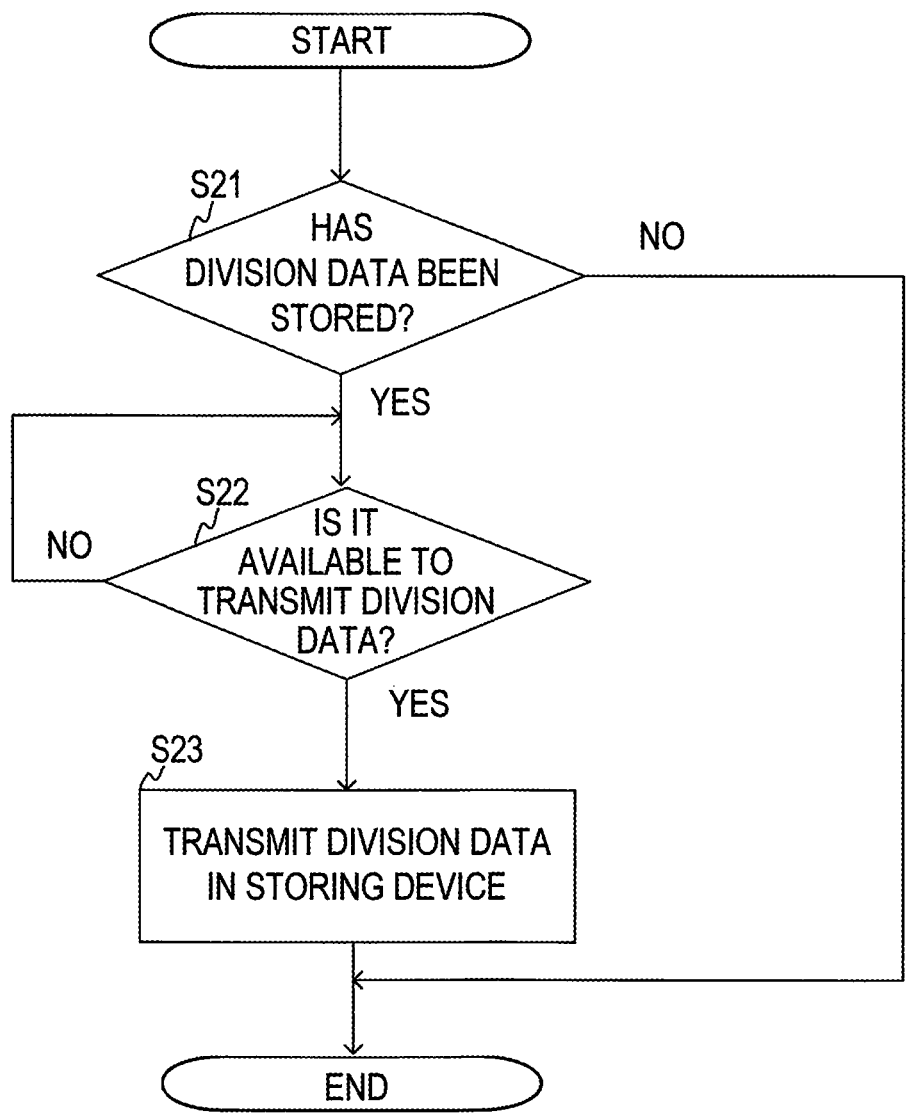
FIG. 13 is a flow diagram explaining an example of the flow of transmitting processing of the cached division data in which the switching device in FIG. 5 performs.

FIG. 13 is a flow diagram to explain an example of the flow of the transmission process of the division data of which the switching device of FIG. 5 carries out for cached data.

Step S21: The whole administration unit 231 of FIG. 5 judges whether or not the division data is stored (cached) in the storing device 213 of FIG. 4. When the whole administration unit 231 determines that the division data is stored in the storing device 213 of FIG. 4 (that is, the step S21/YES), the process moves to the step S22.

Step S22: The transmission available judgment unit 233 of FIG. 5 determines whether the transmission of the data to the switching device of transmission destination is available. When the transmission available judgment unit 233 determines that the transmission is available (that is, the step S22/YES), the process moves to the step S23.

Step S23: The division data transmission control unit 235b in the transmission unit 235 of FIG. 5 sequentially transmits the division data in the storing device 213 to the switching device of the transmission destination.

When the whole administration unit 231 determines that the division data is not stored in the storing device 213 of FIG. 4 (that is, the step S21/NO), the process is finished. When the transmission available judgment unit 233 determines that the transmission is not available (that is, the step S22/NO), the process returns to the step S22.

By the process of the Step S23, the switch device 410 in the fourth datacenter DC40 receives the division data transmitted from the switching device 210 in the second datacenter DC20 and transfers it to the virtual machine execution apparatus 430_1 as described by FIG. 6 and FIG. 7. And the virtual machine execution apparatus 430_1 newly executes the virtual machine for the migration target based on transferred division data.

As described above, the first virtual machine execution apparatus 130_1 divides the data relating to the first virtual machine in response to movement instruction of the first virtual machine 141_1, and transmits the division data to the first virtual machine execution apparatus 430_1 through the first network device, for example, the first switching device 210.

The first switching device 210 judges whether it is available to transmit the division data, which is transmitted from the first virtual machine execution apparatus 130_1, to the second network device, for example, the second switching device 410 provided to the second virtual execution apparatus 430_1 side, and the first switching arrangement 210 stores the division data in the storing device 213, when the transmission is not available. When the first switching device 210 judges that the transmission of the division data to the second switching device 410 is available after the storage of the division data, the first switching device 210 transmits the division data in the storing device 213 to the second switching device 410. And the first virtual machine execution apparatus 430_1 builds the first virtual machine based on the division data transmitted from the first virtual machine execution apparatus 130_1.

According to the first embodiment, when a bottleneck occurs in the network between switches provided between the virtual machine execution apparatus of the origin of movement and the virtual machine execution apparatus of the destination of movement, the switching device, which positions just before the bottleneck occurrence position, temporarily stores (caches) the division data of the virtual machine targeted for the migration. Therefore it is possible that the virtual machine execution apparatus of the origin of movement quickly transmits the division data to other switching device except the own device.

Because the transmission quantity of the division data remarkable decreases in the network of which a bottleneck produces when the switching device does not carry out the storage process of the division data, it is not possible that the virtual machine execution apparatus of the origin of movement quickly transmits the division data to other switching device. However, according to the first embodiment, the switching device carries out the storage process of the division data as described above. In other words, the switching device becomes the saucer of the division data temporarily. Therefore it is possible that the virtual machine execution apparatus of the origin of movement quickly transmits the division data to other switching device.

In addition, the switching device, which is provided in front of the network in which a bottleneck produces, performs the storage process of the division data. In other words, the switching device, which is provided in the short distance from the virtual machine execution apparatus of the destination of movement, carries out the storage process of the division data. Therefore the division data quickly arrive at the virtual machine execution apparatus of the destination of movement when the switching device transmits the division data which are stored to the virtual machine execution apparatus of the destination of the movement at a resolve of the bottleneck. As a result, it is possible to carry out the migration of the virtual machine with a high speed.

(Second Embodiment)

In the first embodiment, the switching device 210 in the second datacenter DC20 stored the division data in the storing device 213 in the own device as described by FIG. 4 and FIG. 5. However, because the empty space of the storing device 213 is not sufficient when the switching device 210 stores other data in the storing device 213 or the data size of the division data is big, there is a case not to store all division data transmitted in the storing device.

In such a case, a server device 250_1 connecting to the switching device 210 is used as a storing device of the division data.

(Constitution of the Datacenter DC20)

Based on FIG. 14 and FIG. 15, the switching device according to the second embodiment will be explained.

Figure 14:
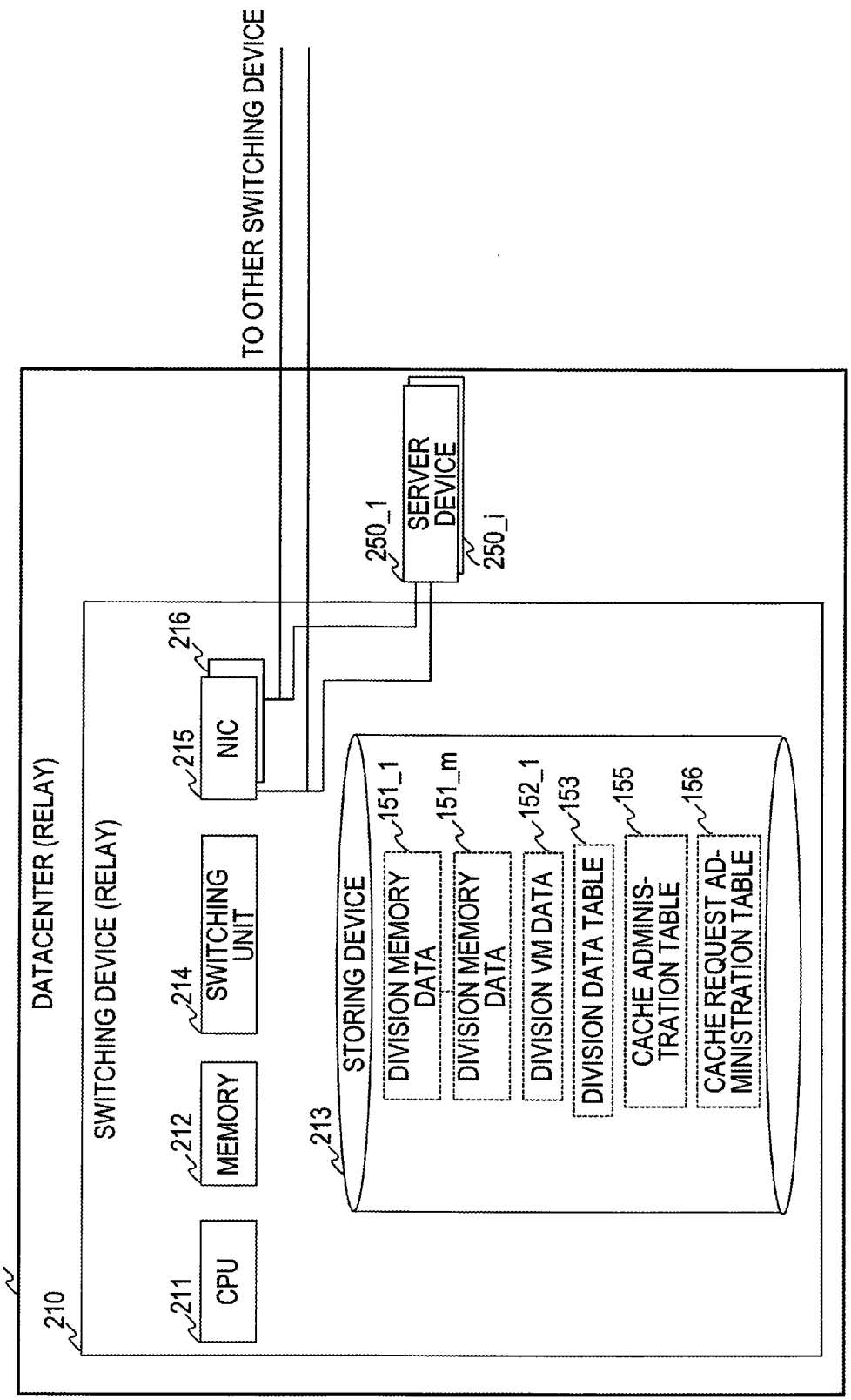
FIG. 14 is a block diagram hardware organization of the switching device in a second embodiment.

FIG. 14 is a block diagram indicating the hardware constitution of the switching device according to the second embodiment. FIG. 14 is a diagram corresponding with FIG. 4 and string contents of the storing device 213 in FIG. 14 are different from that in FIG. 4. And FIG. 14 indicates a state that the division memory data 151_1-151_m, the division VM data 152_1, the division data table 153, the cache management table 155, and the cache request administration table 156 are stored. In addition, the division memory data 151_1-151_m, the division VM data 152_1, the division data table 153, the cache management table 155, and the cache request administration table 156 are not yet stored before the migration of the virtual machine.

Figure 15:
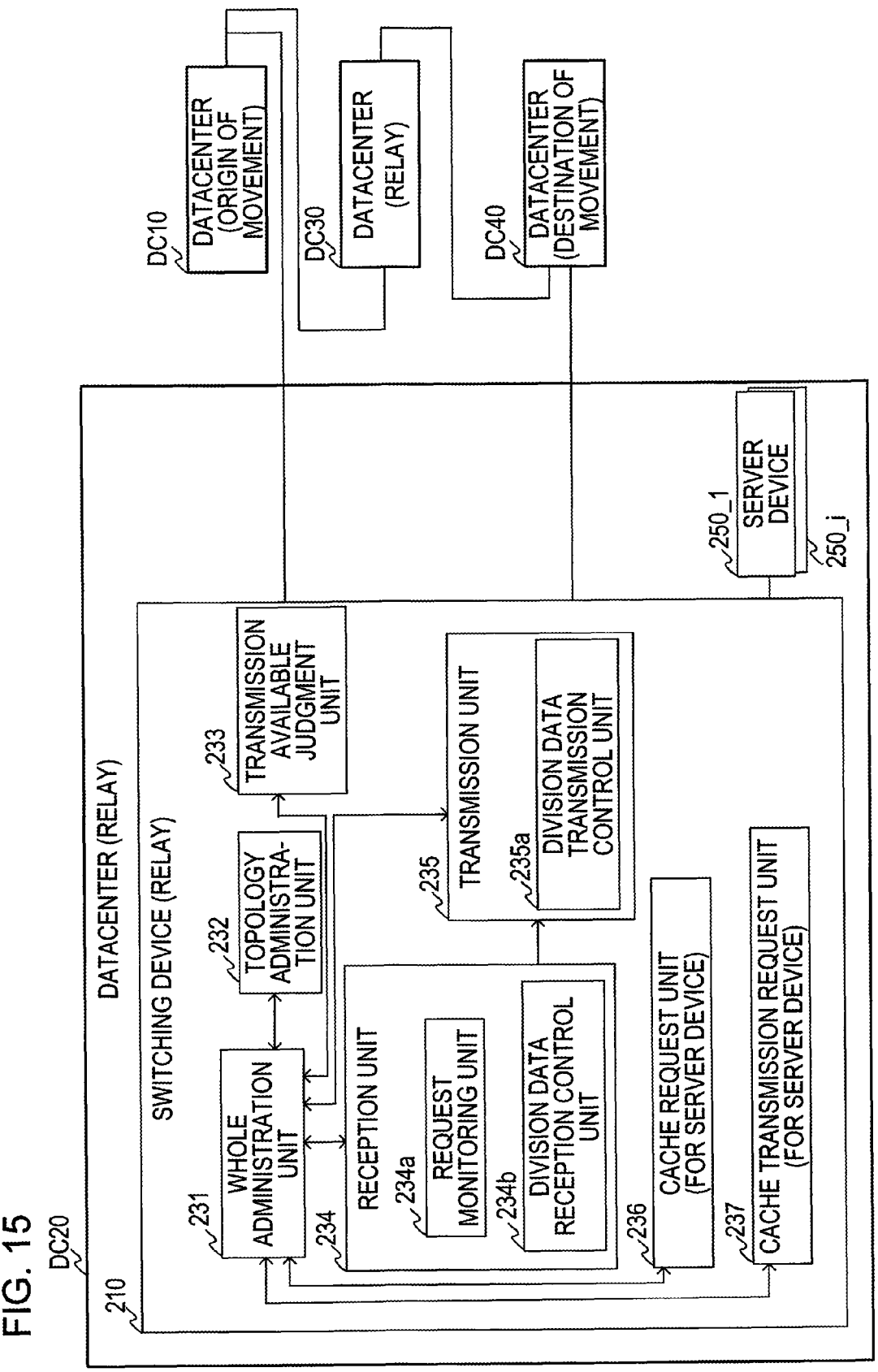
FIG. 15 is a block diagram of the software module of the switching device in the second embodiment.

FIG. 15 is a block diagram indicating the software module of the switching device according to the second embodiment. The switching device 210 has a cache request unit (for use of the server device) 236 which requests the storage (cache) process of the division data to the server device 250_1 which connects to the switching device 210 and a cache transmission request unit (for use of the server device) 237 which requests to transmit the division data stored by the server device 250_1 to own device 210 in addition to each block which are explained in FIG. 5. The whole administration unit 231 of FIG. 15 stores information to distinguish a server device to connect in an own device, for example, the IP address of this server device.

Based on FIG. 16 and FIG. 17, the server device according to the second embodiment will be explained.

Figure 16:
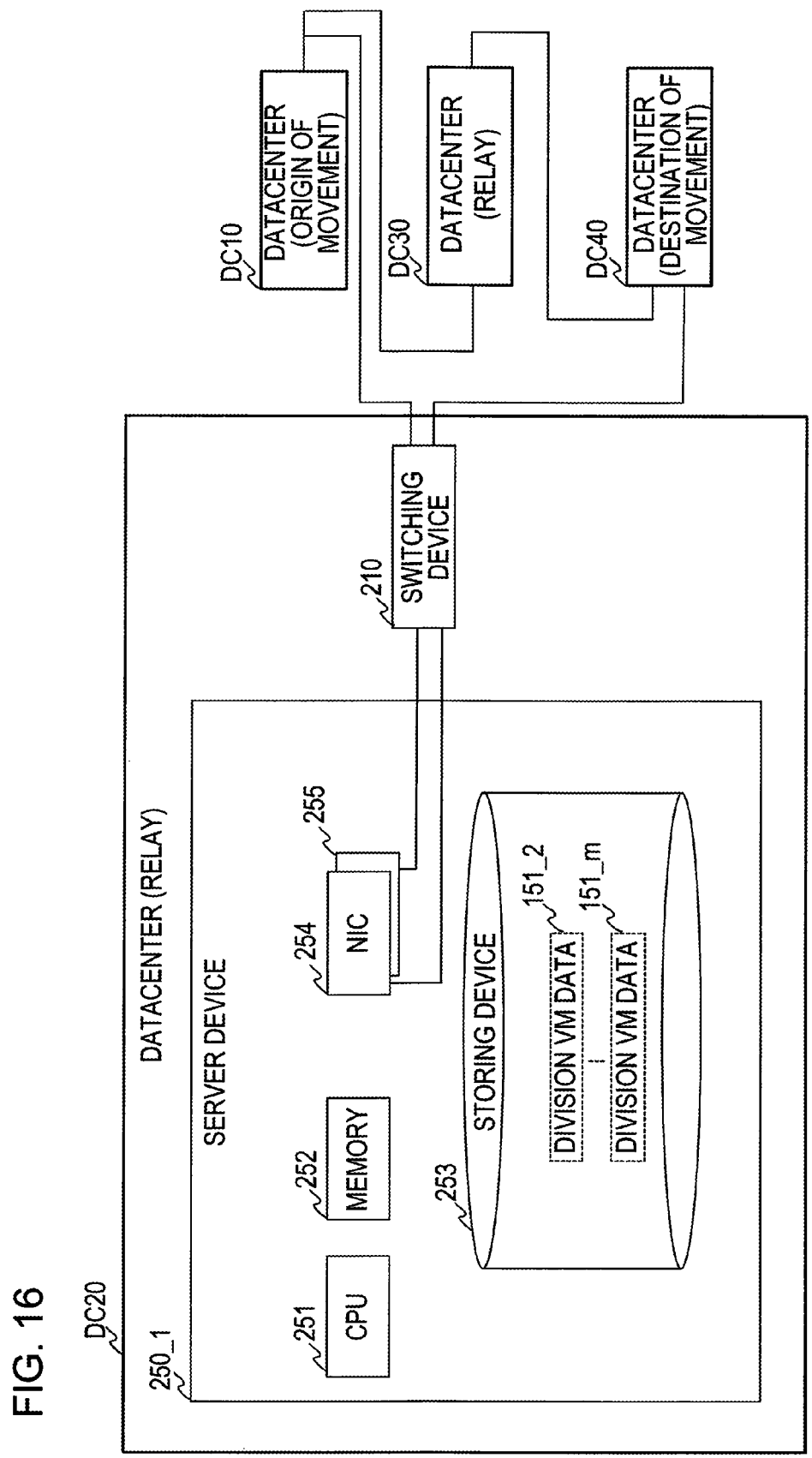
FIG. 16 is a block diagram of the hardware organization of the server device connected to the switching device in FIG. 14 and FIG. 15.

FIG. 16 is a block diagram indicating the hardware constitution of the server device to connect to the switching device 210 of FIG. 14 and FIG. 15.

Figure 17:
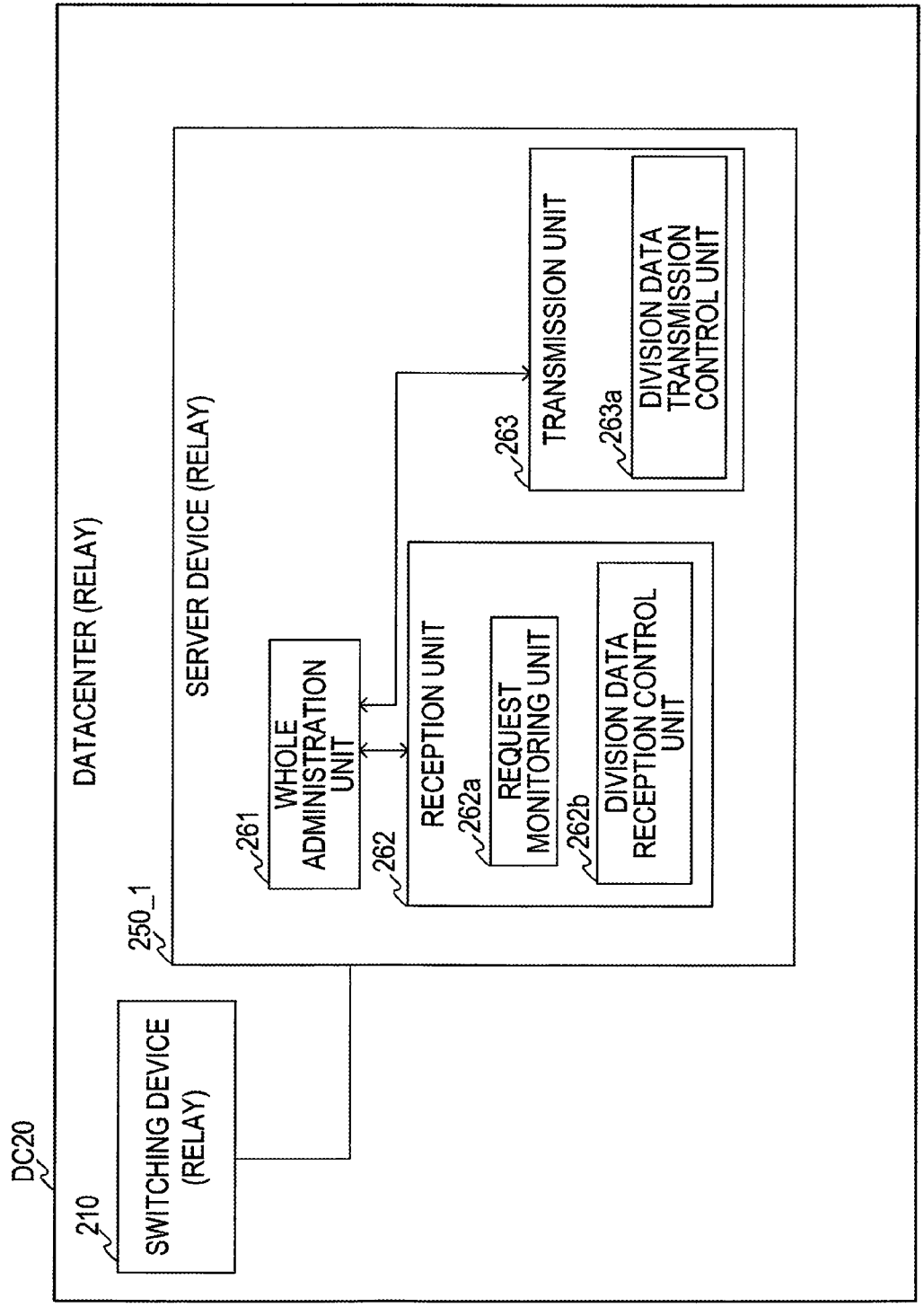
FIG. 17 is a block diagram of the software module of the server device connected to the switching device in FIG. 14 and FIG. 15.

FIG. 17 is a block diagram indicating the software module of the server device to connect to the switching device 210 of FIG. 14 and FIG. 15.

In addition, in FIG. 16 and FIG. 17, the server device 250_1 in the second datacenter DC20 will be explained for example, but the other server device 250_i, and server device 350_1-server device 350_j in FIG. 1 may have the same constitution.

In FIG. 16, the server device 250_1 has a CPU 251, a memory 252, a storing device 253 and a first NIC 254, a second NIC 255, which are connected through a bus (not illustrated in FIG. 16) mutually, for example The CPU 251 is a computer which controls the whole of server device 250_1. The memory 252 stores data which are processed in various information processing that the CPU 251 carries out. The storing device 253, for example, is a storing device such as a nonvolatile memory and the magnetic storing device as explained by FIG. 2. The first NIC 254 and the second NIC 255 are dedicated board which performs communication and function as data communication unit. In addition, the NIC may be only one or more than three.

In FIG. 17, a whole administration unit 261 manages a reception unit 262 and a transmission unit 263. The reception unit 262 performs data reception process. A request monitoring unit 262a in the reception unit 262 monitors whether there are various requests including the cache request and transmission process of the division data which were cached, etc. A division data reception control unit 262b in the reception unit 262 controls the reception process of the division data. The transmission unit 263 performs data transmission process. The Division data transmission control unit 263a in the transmission unit 263 controls the transmission process of the division data.

The programs to function as the whole administration unit 261, the reception unit 262 and the transmission unit 263 are stored in the storing device 253 of FIG. 16, for example. And the CPU 251 reads these programs from the storing unit 253 and develops these programs in the memory 252 at the time of start, thereby these programs are functionalized as a software module.

(Cache Request for Server Device 250_1 in the Datacenter DC20)

Based on FIG. 14, FIG. 15, FIG. 18, and FIG. 19, the cash request for the server device 250_1 will be explained.

FIG. 18 is an example diagram of a table which is storing data relating to the division data of which the switching device 210 of FIG. 15 performed a cache at an own device.

Figures 19, 20:
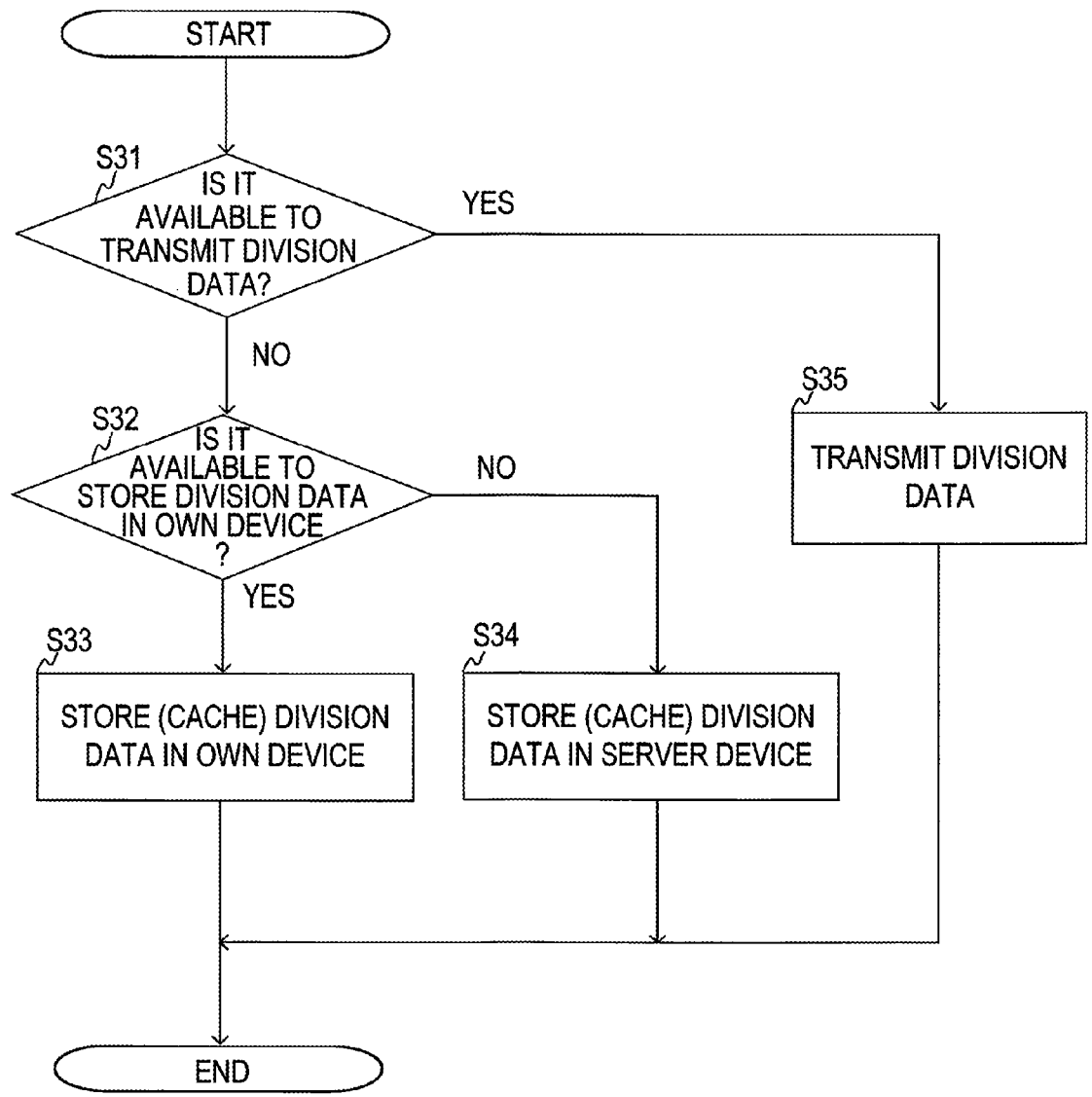
FIG. 19 is an example diagram of a table which is storing an identifier of the division data which is a cash request target for the server device in FIG. 17.
FIG. 20 is a flow diagram explaining an example of the flow of the cash processing of which the switching device illustrated by FIG. 15 and the server device illustrated by FIG. 17 perform.

FIG. 19 is a example diagram of a table which is storing the identifiers of the division data for the cache request for the server device 250_1 of FIG. 17.

In this description, as described in the first embodiment, the switching device 210 of FIG. 15 has stored the division data which are received in the storing device 213 of FIG. 14. For example, in the example of FIG. 14, the switching device 210 of FIG. 15 sequentially stores the division memory data 151_1, etc. in the storing device 213.

Here, the whole administration unit 231 stores, the information relating to the division data which were stored, in the storing device 213 to the cache management table 155 of FIG. 18.

The cache management table 155 is a table corresponding to the division data table 153 of FIG. 9. The whole administration unit 231 of FIG. 15 stores an IP address (0.1.2.3) of the origin of movement, an IP address (1.2.5.7) of the destination of movement, an identifier of the division data (ID151_1-ID152_1), a context identifier (0 or 1), and data size (10 Mbyte), which are information relating to the division memory data 151_1-151_m and the division VM data 152_1, which is the division data stored in the storing device 213 of FIG. 14, in the cache management table 155.

In addition, the whole administration unit 231 of FIG. 15 monitors free space of the storing device 213 of FIG. 14, and judges that it is available whether the division data is stored in the storing device 213.

In the example of FIG. 14, when the storing device 213 stores the division memory data 151_1-151_m, and the division VM data 152_1, because the free space of the storing device 213 is not sufficient, it is not possible to no longer store the division data.

When the whole administration unit 231 determines that it is not possible to store the division data no longer, because the free space of the storing device 213 is not sufficient, the whole administration unit 231 instructs to the cache request unit 236 to perform a cache request.

The cache request unit 236 requests to the server device 250_1 to carry out the cache process of the division data in response to the cache request from the whole administration unit 231.

Furthermore, the whole administration unit 231 instructs to the transmission unit 235 to transmit the division data which are received by the division data reception unit 234 to the server device 250_1 afterward. The division data transmission control unit 235a in the transmission unit 235 transmits the division data received by the division data reception unit 234 to the server device 250_1 in response to this instruction. In the above example, the division data transmission control unit 235a transmits the division VM data 152_2-152_n to the server device 250_1.

At a same time, the whole administration unit 231 stores the identifier of the division data which is transmitted to the device of the cache request destination and an identifier (e.g., an IP address) to distinguish the device of the cache request destination uniquely in the cache request administration table 156 of FIG. 19. In the above example, the device of the cash request destination is the server device 250_1.

The cache request administration table 156 has the identifier column of the division data and the IP address column of the device of the cache request destination.

The whole administration unit 231 stores the identifier ID152_2-ID152_n of the division data transmitted to the server device 250_1 and the IP address 10.11.12.13 of the server device 250_1 of the cache request destination to the cache request administration table 156.

(Cache Process in the Server Device 250_1 in the Datacenter DC20)

Based on FIG. 16 and FIG. 17, the cache process of the division data of which the server device 250_1 carries out will be explained.

The reception unit 262 of FIG. 17 receives the cache request of the division data from the switching device 210. At this time, the request monitoring unit 262a always monitors the reception of the cache request. When the reception unit 262 receives the cache request, the request monitoring unit 262a notifies the reception of the cache request to the whole administration unit 261. The whole administration unit 261 instructs to the division data reception unit 262b to store the division data from the switching device 210 of which the reception unit 262 received in the storing device 253 (referring to FIG. 16) in response to this notice.

The division data reception control unit 262b stores the division data of which the reception unit 262 received in the storing device 253 (referring to FIG. 16) in response to this storing instruction. In the case of the above example, the reception unit 262 receives the division VM data 152_2-152_n. The division data reception control unit 262b stores the division VM data 152_2-152_n in the storing device 253.

(Transmission Process of the Division Data which are Cached in the Switching Device 210 in the Datacenter DC20)

The transmission process of the cached division data of which the switching device 210 carries out will be explained based on FIG. 14-FIG. 17. As described in the first embodiment, when the transmission available judgment unit 233 of FIG. 15 judges that it is available to transmit the data to the switching device of the data transmission destination, the whole administration unit 231 instructs to the transmission unit 235 to transmit the division data in the storing device 213 of FIG. 14 in response to this notice. The transmission control unit 235a in the transmission unit 235 sequentially transmits the division data in the storing device 213 to the switching device of the data transmission destination in response to this transmission instruction. In the example of FIG. 14, the division data transmission control unit 235a transmits the division memory data 151_1-151_m, and the division VM data 152_1 in the storing device 213 to the switching device 410 in the fourth datacenter DC40.

The whole administration unit 231 determines whether the division data is stored in the server device 250_1. For example, the whole administration unit 231 determines that the division data was stored in the server device 250_1 when the cache request administration table 156 is stored in the storing device 213, for example.

When the whole administration unit 231 determines that the division data is stored in the server device 250_1, the whole administration unit 231 instructs to the cache transmission request unit 237 to carry out the cache transmission request. The cache transmission request unit 237 requests to the server device 250_1 to carry out the transmission of division data in response to this cache transmission instruction.

The reception unit 262 in the server device 250_1 of FIG. 17 receives the cache transmission request of the division data from the switching device 210. When the reception unit 262 receives the cache transmission request, the request monitoring unit 262a notifies the reception of the cache transmission request to the whole administration unit 261.

The whole administration unit 261 instructs the division data transmission control unit 263a in the transmission unit 263 to transmit the division data in the storing device 253 of FIG. 16 to the switching device 210 in response to this notice. The division data transmission control unit 263a transmits the division data in the storing device 253 to the switching device 210 in response to this transmission instruction. In addition, the division data transmission control unit 263a transmits the division data (context data) that the context identifier indicates "1", with precedence.

In the example of FIG. 16, the division data transmission control unit 263a transmits the division VM data 151_2-151_m to the switching device 210 of FIG. 15.

The division data reception control unit 234b in the switching device 210 of FIG. 15 outputs the division data of which the reception unit 234 receives from the server device 250_1 to the transmission unit 235. The division data transmission control unit 235a of the transmission unit 235 transmits input division data to the switching device 410 in the fourth datacenter DC40.

In addition, the division data reception control unit 234b compares the identifier of the division data which is received with the identifier stored in the identifier column of division data in the cache request administration table 156 of FIG. 19 and judges that the division data which is received is division data from the server device 250_1 when the compare result indicates a match.

By the process explained by the above, it is possible that the switching device utilizes a server device to connect to the switching device as a storing device.

(Flow of the Cache Process of Division Data)

FIG. 20 is a flow diagram to explain an example of the flow of the cache process that the switching device of FIG. 15 and the server device of FIG. 17 carry out. Because in FIG. 20, the process in the step S31 is same as the process in the step S11 of FIG. 12, the process in the step S33 is same as the step S12 of FIG. 12, and the process in step S35 is same as the step S13 of FIG. 12, the explanation in the steps S31, S33 and S35 omit appropriately.

When the transmission available judgment unit 233 judges that it is not available to transmit the division data (the step S31/YES), the process moves to the step S32.

Step S32: The whole administration 231 unit of FIG. 15 judges whether it is available that an own device (storing device 213 of FIG. 14) stores the division data which is received. When it is available to store it (the step S32/YES), the process moves to the step S33.

Step S33: The division data reception control unit 234b of FIG. 15 stores the division data of which the reception unit 234 received in the storing device 213 (referring to FIG. 14). In addition, the whole administration unit 231 stores the information relating to the division data which was stored (cached) to the storing unit 213 to the cache management table 155 of FIG. 18 then.

When an own device cannot store the division data which is received (the step S32/NO), the process moves to the step S34.

Step S34: The division data transmission control unit 235 of FIG. 15 transmits the division data of which the division data reception unit 234 receives to the server device 250_1 of FIG. 17 and stores the division data in the server device 250_1. The division data reception unit 262b in the server device 250_1 of FIG. 17 stores the division data which is received in the storing device 253 of FIG. 16. In addition, the whole administration unit 231 of FIG. 15 stores an identifier of division data which is transmitted to the server device 250_1 and an identifier to distinguish a device of the cache request destination uniquely to the cache request administration table 156 of FIG. 19.

When the transmission available judgment unit 233 determines that the transmission is available (step S31/YES), the transmission unit 235 carries out the transmission process of the division data (the step S35).

(Flow of the Transmission Process of Division Data which is Cached)

Figure 21:
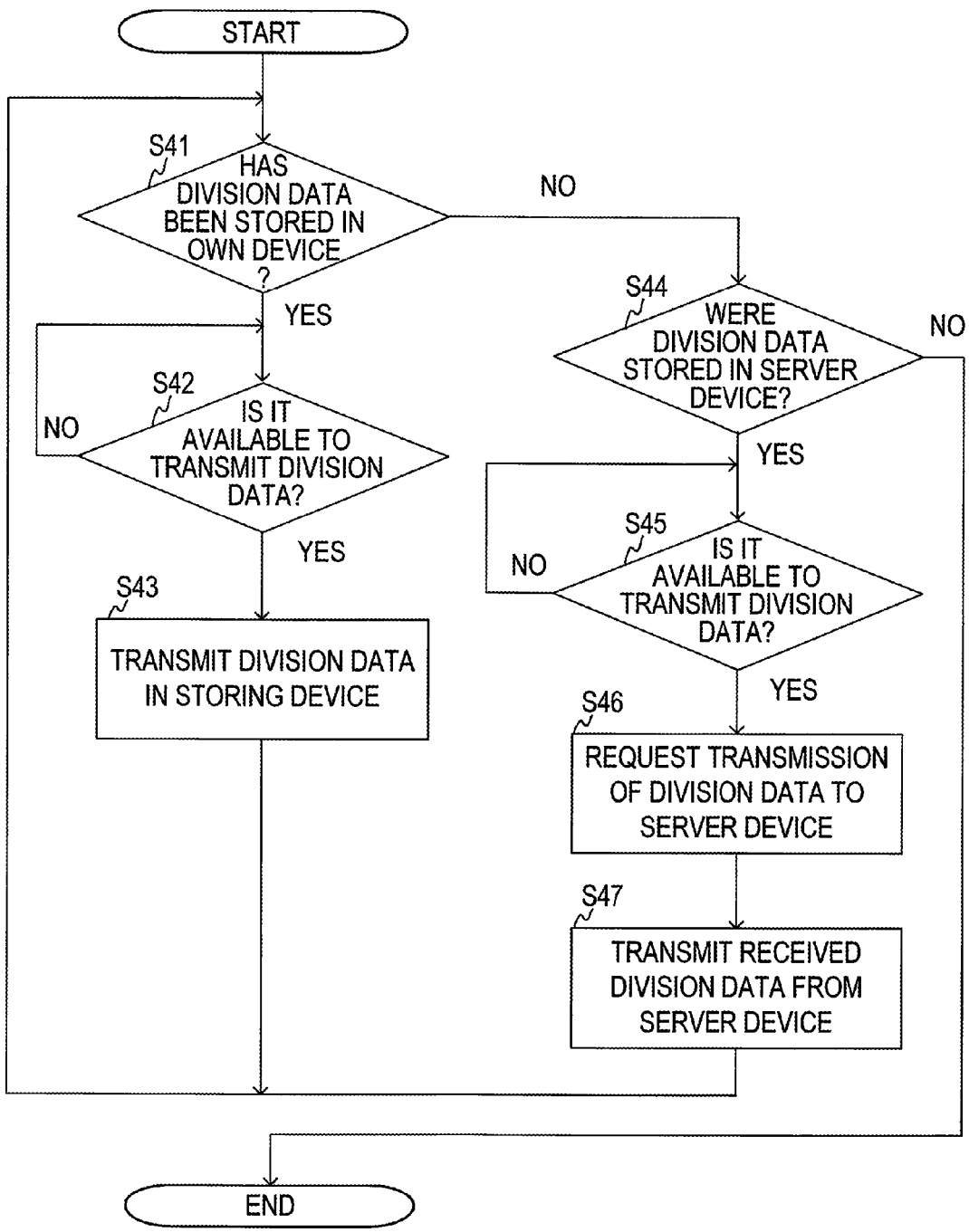
FIG. 21 is a flow diagram explaining an example of the flow of the processing to which the switching device illustrated by FIG. 15 transmits the division data of which the switching device illustrated by FIG. 15 and the server device illustrated by FIG. 17 have cached.

FIG. 21 is a flow diagram to explain an example of the process flow that the switching device transmits the division data of which the switching device of FIG. 15 and the server device of FIG. 17 performed a cache. Because process of step S41-step S43 of FIG. 21 is same as process in the step S21-step S23 of the flow diagram in FIG. 13, explanations of these process are omitted appropriately.

Step S41: The whole administration unit 231 of FIG. 15 judges whether the division data were stored (cached) by an own device (the storing device 213 of FIG. 14). When the division data were stored in the storing device 213 of FIG. 4 (the step S41/YES), the process moves to the steps S42 and S43.

When the division data were not stored in the storing device 213 of FIG. 4 (the step S41/NO), the process moves to the step S44.

Step S44: The whole administration unit 231 judges whether the division data were stored in the server device 250_1. When the division data were stored in the server device 250_1 (the step S44/YES), the process moves to step S45.

Step S45: The transmission available judgment unit 233 of FIG. 15 judges whether it is available to transmit data to the switching device of the destination of data. When the transmission available judgment unit 233 determines that the transmission is available (the step S45/YES), the process moves to step S46.

Step S46: The cache transmission request unit 237 of FIG. 15 requests to the server device 250_1 of FIG. 17 to carry out the transmission of division data. The transmission control unit 263 in the server device 250_1 of FIG. 17 transmits the division data of the own device (the storing device 253 of FIG. 16) to the switching device 210 of FIG. 15.

Step S47: The division data transmission control unit 235 in the switching device 210 sequentially transmits the division data from the server device 250_1 of which the reception unit 234 received to the switching device of the destination of data. In addition, the process returns to the step S41 when the process in the step S43 and the step S47 are finished.

By the explanation mentioned above, the switching device 210 carried out a cache request to the server device 250_1, but may carry out a cache request to other server devices except the server device 250_1 in same datacenter DC20. By this process, it is possible to cache more division data.

According to the second embodiment, in a case that it is not available that the switching device carries the cache of the division data, it is possible to carry out the cache process by using the server device to connect to the switching device. Therefore, it is possible that the switching device caches more division data by using this server device.

[A Third Embodiment]

In the second embodiment, the switching device requested the server device which connects to an own device for the storage processing of the division data when it is not available that the switch device stores the division data in the storing device of the own device. However, it is not available that this server device carries out the storage process of the division data when the free space of the storing device in the server device to connect to the own device is not sufficient. Besides, it is not available that this server device carries out the storage process of the division data when the server device to connect to the switching device are not started either.

In such a case, other switching devices carry out the storage process of division data.

In the third embodiment, it will be explained that other switching devices and a server device to connect to the other switching devices cache the division data.

(Information System)

Figure 22:
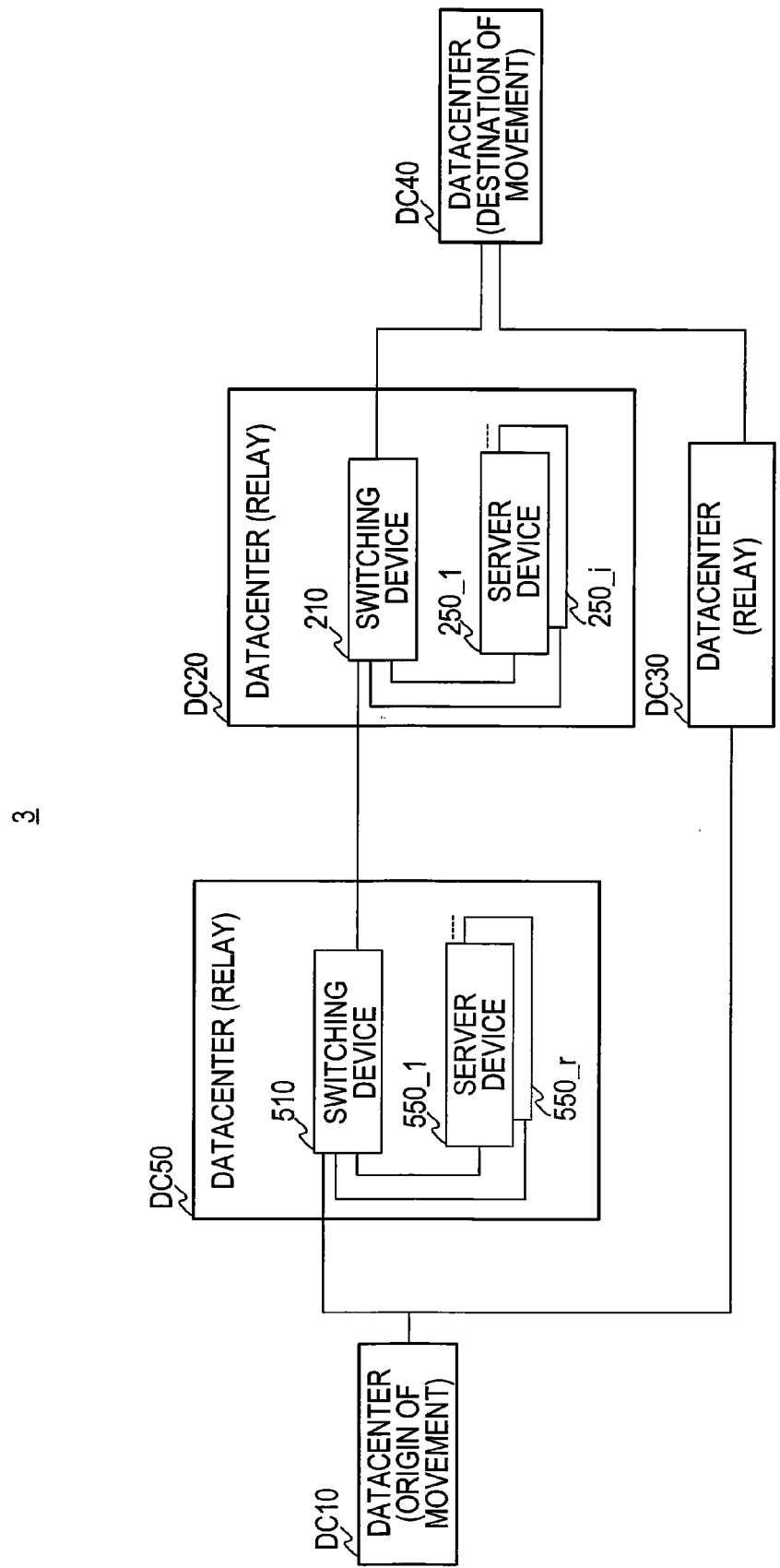
FIG. 22 is a schematic structure diagram of the information processing system according to a third embodiment.

FIG. 22 is a block diagram of outline constitution of the information system 3 according to the third embodiment. The information system 3 further includes a fifth datacenter DC50 in addition to the first datacenter DC10-the fourth datacenter DC40 which is explained with the information system 1 of FIG. 1. In addition, in FIG. 22, the description of internal constitution in the first datacenter DC10, the third datacenter DC30, and the fourth datacenter DC40 are omitted.

The fifth datacenter DC50 includes the switching device 510 and the first server device 550_1-rth server device 550_r. The switching device 110 in the first datacenter DC10 connects with the switching device 510 in the fifth datacenter DC50 and the switching device 310 in the third datacenter DC30 through a network. The switching device 510 in the fifth datacenter DC50 connects with the switching device 110 in the first datacenter DC10 and the switching device 210 in the second datacenter DC20 through a network.

The switching device 510 in the fifth datacenter DC50 connects with the first server device 550_1-rth server device 550_r in the fifth datacenter DC50 more.

(Switching Arrangement 210 of Second Datacenter DC20)

Figure 23:
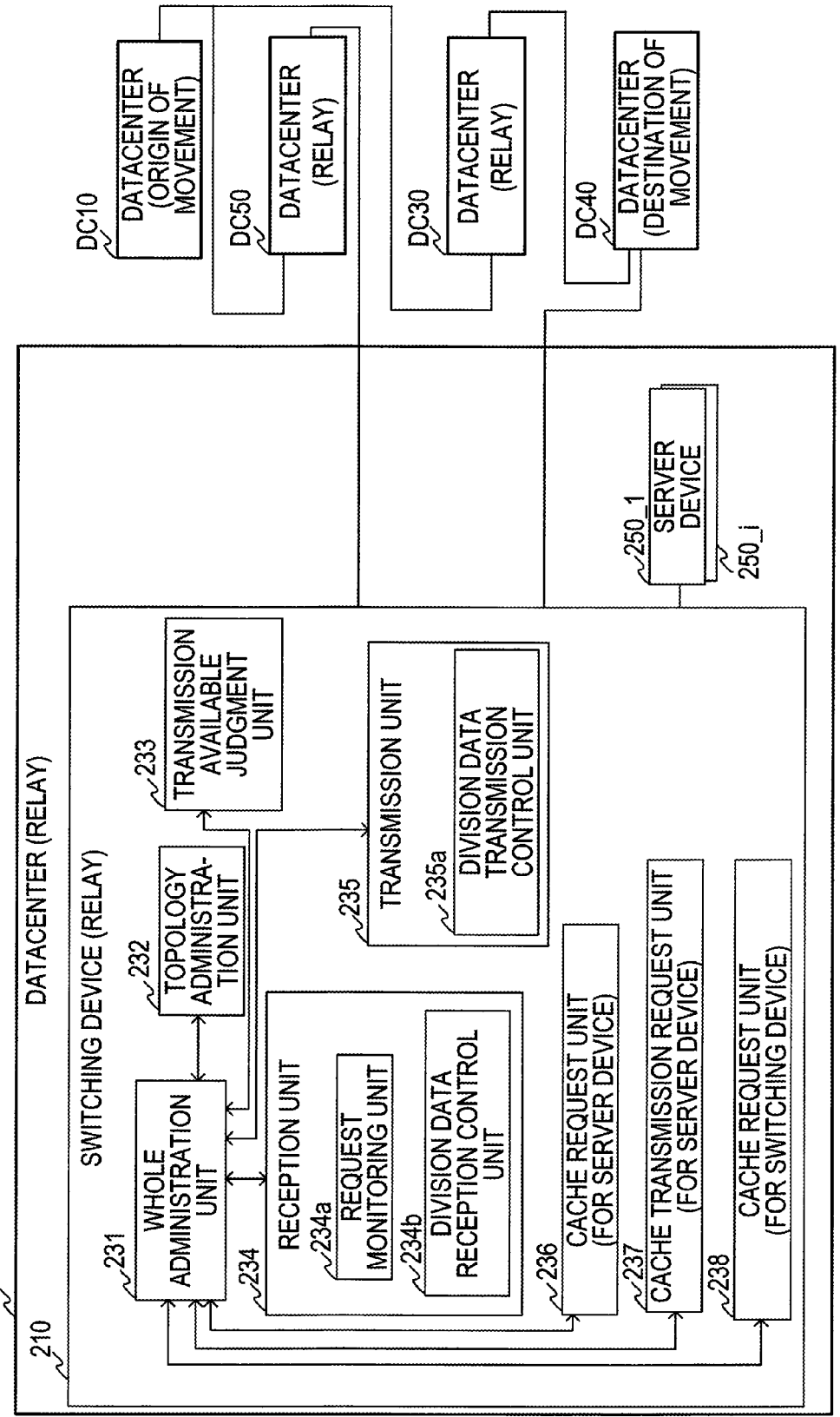
FIG. 23 is a block diagram illustrating the software module of the switching device according to the third embodiment of FIG. 22.

FIG. 23 is a block diagram indicating the software module of the switching device 210 in according to the third embodiment of FIG. 22. The switching device 210 includes a cache request unit (for use of the switching device) 238 which requests the storage (cache) process of the division data to the switching device which connects to the switching device 210, in addition to each block as explained in FIG. 15. In addition, the CPU 211 in the switching device 210 explained in FIG. 14 carries out the software module of FIG. 23 as explained by FIG. 14.

(Switching Device 510 in the Fifth Datacenter DC50)

Based on FIG. 24 and FIG. 25, the switching device 510 in the fifth datacenter DC50 will be explained.

Figure 24:
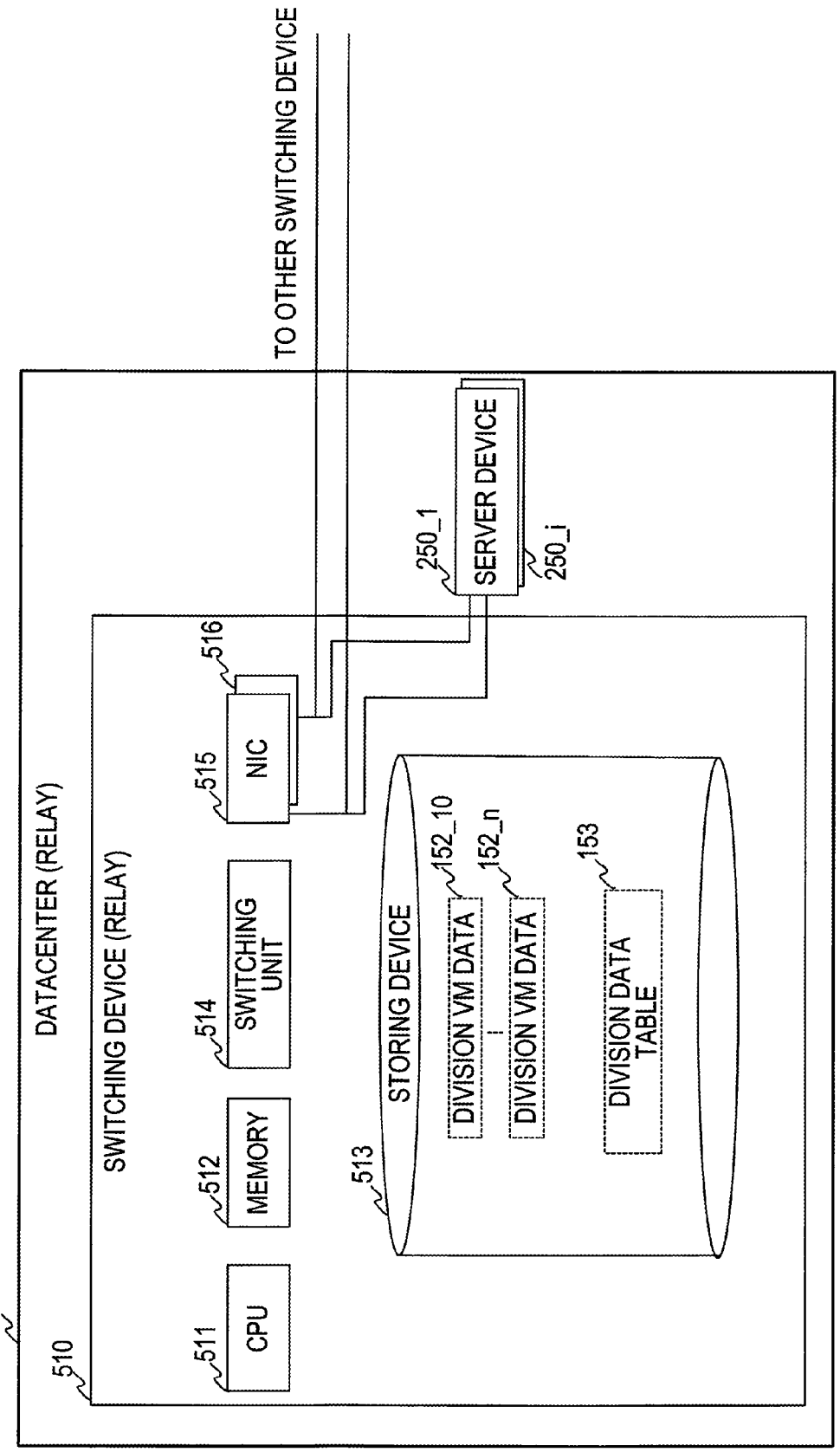
FIG. 24 is a block diagram illustrating the hardware organization of other switching device according to the third embodiment of FIG. 22.

FIG. 24 is a block diagram indicating the hardware constitution of the switching device 510 according to the third embodiment of FIG. 22.

Figure 25:
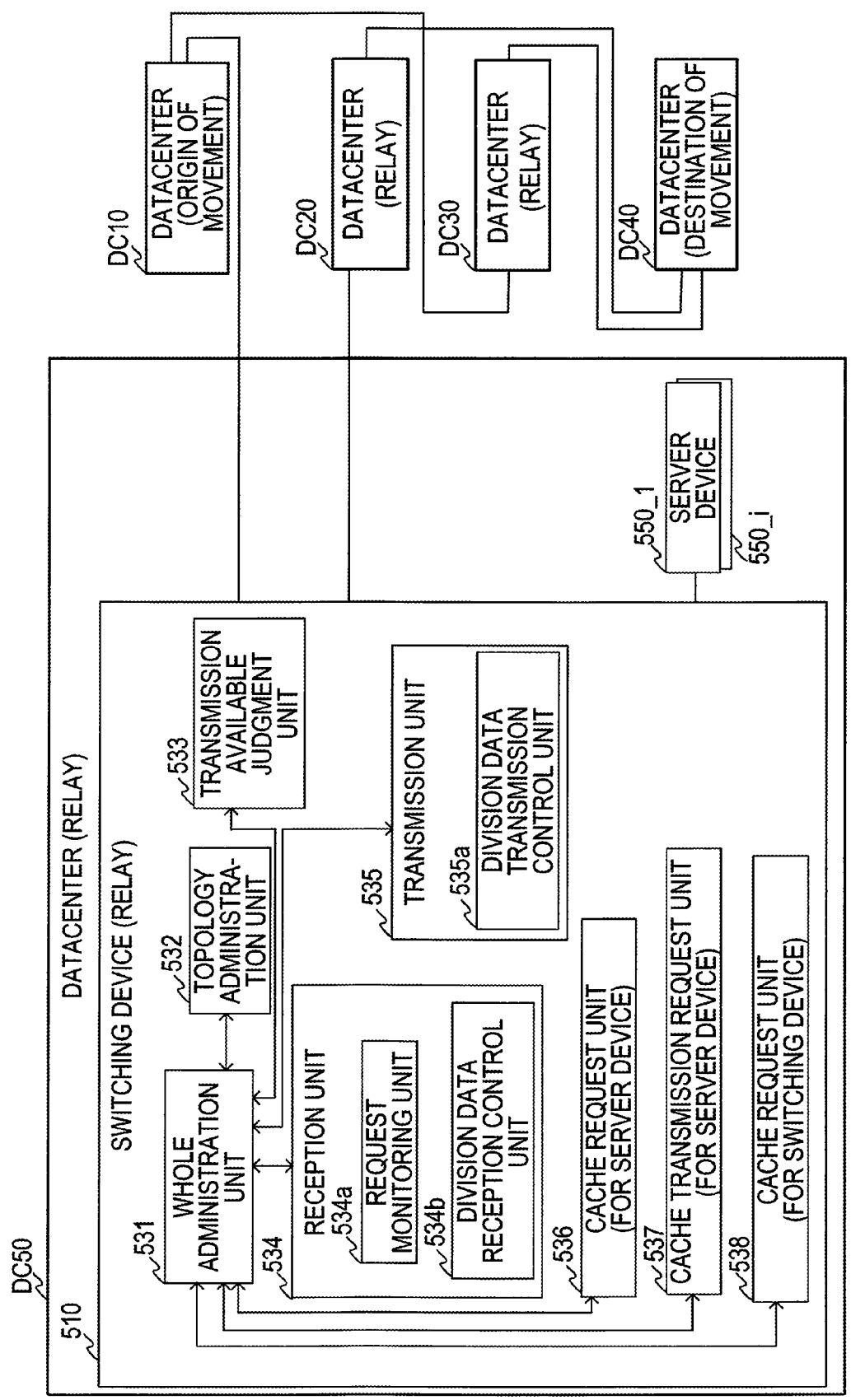
FIG. 25 is a block diagram illustrating the software module of the other switching device according to the third embodiment of FIG. 22.

FIG. 25 is a block diagram indicating the software module of the switching device 510 according to the third embodiment of FIG. 22.

The CPU 511, the memory 512, the storing device 513, the switching device 514, the first NIC 515 and the second NIC 516 in FIG. 24 have same functions as the CPU 211, the memory 212, the storing device 213, the switching device 214, the first NIC 215 and the second NIC 216 in FIG. 14, respectively.

The whole administration unit 531, the topology administration unit 532, the transmission available judgment unit 533, the reception unit 534, the transmission unit 535, the cache request unit (use for the server device) 536, and the cache transmission request unit 537 in FIG. 25 have same function as the whole administration unit 231, the topology administration unit 232, the transmission available judgment unit 233, the reception unit 234, the transmission unit 235, the cache request unit (use for the server device) 236, and the cache transmission request unit (use for the server device) 237 in FIG. 15, respectively.

(Cache Process that the Switching Device 210 in the Second Datacenter DC20 Carries Out)

Based on FIG. 16, FIG. 17, FIG. 22, and FIG. 23, the cache process of the division data, of which the switching device 210 in the second datacenter DC20 carries out, will be explained.

In the following description, the switching device 510 in the fifth datacenter DC50 of FIG. 22 receives the division data transmitted by the first datacenter DC10 and transfers the division data received to the switching device 210 in the second datacenter DC20.

At first the whole administration unit 231 in the switching device 210 in FIG. 23 judges whether it is available to store the division data which is newly received to the server device 250_1 of FIG. 17 when the free space of the storing device 213 (referring to FIG. 14) of the own device is not sufficient. Specifically, as described in the second embodiment, the cache request unit (use for the server device) 236 of FIG. 23 requests the cache of the division data to the server device 250_1 of FIG. 17. The server device 250_1 carries out the cache process of division data in response to this cache request.

Here, when the whole administration unit 261 in the server device 250_1 judges that it is not available to carry out the cache process of the division data by detecting that the free space of the storing device 253 (referring to FIG. 16) of the own device is not enough, the whole administration unit 261 notifies the switching device 210 of FIG. 23 that the cache is not available. In addition, it is possible to perform this notice with the SNMP trap which was explained with the first embodiment.

When the reception unit 234 in the switching device 210 receives the notice of which the cache is not available, the whole administration unit 231 judges that it is not available to store the division data to receive newly in the server device 250_1 of FIG. 17. And the whole administration unit 231 instructs to the cache request unit 238 to perform the cache request to the other switching device. The cache request unit 238 carries out the cache request to the other switching device in response to this cache request instruction. Here, the other switching device (the third network device) is a switching device provided on the virtual machine execution apparatus 130_1 of the origin of movement side on the basis of the switching device 210 (own device). In the case of FIG. 22, it is the switching device 510 in the fifth datacenter DC50. In addition, the topology administration unit 231 of FIG. 23 manages information to identify the other switching device, for example, the IP address, etc.

(Cache Process that the Switching Device 510 in the Fifth Datacenter DC50 Carries Out)

Based on FIG. 24 and FIG. 25, the cache process that the switching device 510 in the fifth datacenter DC50 carries out will be explained.

When the request monitoring unit 534a in the reception unit 534 of FIG. 25 receives the cache request from the switching device 210, the request monitoring unit 534a notifies to the whole administration unit 531 that the cache request was received from the switching device 210 of FIG. 23. In addition, at this time, the reception department 534 receives the division data transmitted by the switching device in the first datacenter DC10 of FIG. 22.

The whole administration unit 531 instructs to the division data reception control unit 534b to store the division data which the reception unit 534 has received in the storing device 513 of FIG. 24 in response to this notice sequentially. The division data reception control unit 534b stores this division data in the storing device 513 in response to this storing instruction.

In the example of FIG. 24, the division data reception control unit 534b stores the division VM data 152_10-division VM data 152_n in the storing device 513. The division data table 153 in the storing device 513 is a division data table which the virtual machine execution apparatus 130_1 of FIG. 3 transmitted as described by the first embodiment. In addition, in the example of FIG. 24, the switching device 210 or the server device to connect to the switching device 210 in FIG. 23 stored the division memory data 151_1-the division memory data 151_m, and the division VM data 152_1-the division VM data 152_n, as illustrated by FIG. 2 in an own device.

Furthermore, when it is not available that the switching device 510 of FIG. 25 did the cache of the division data in the own device, the switching device 510 performs a cache request of the division data to the server device 550_1 to connect to the switching device as explained in FIG. 22 according to the second embodiment.

And the switching device 510 of FIG. 25 carries out the transmission process of the division data which were stored in the own device or the server device 550_1 to connect to the own device as described by FIG. 21 according to the second embodiment.

(Flow of the Cache Process in the Switching Device)

Figure 26:
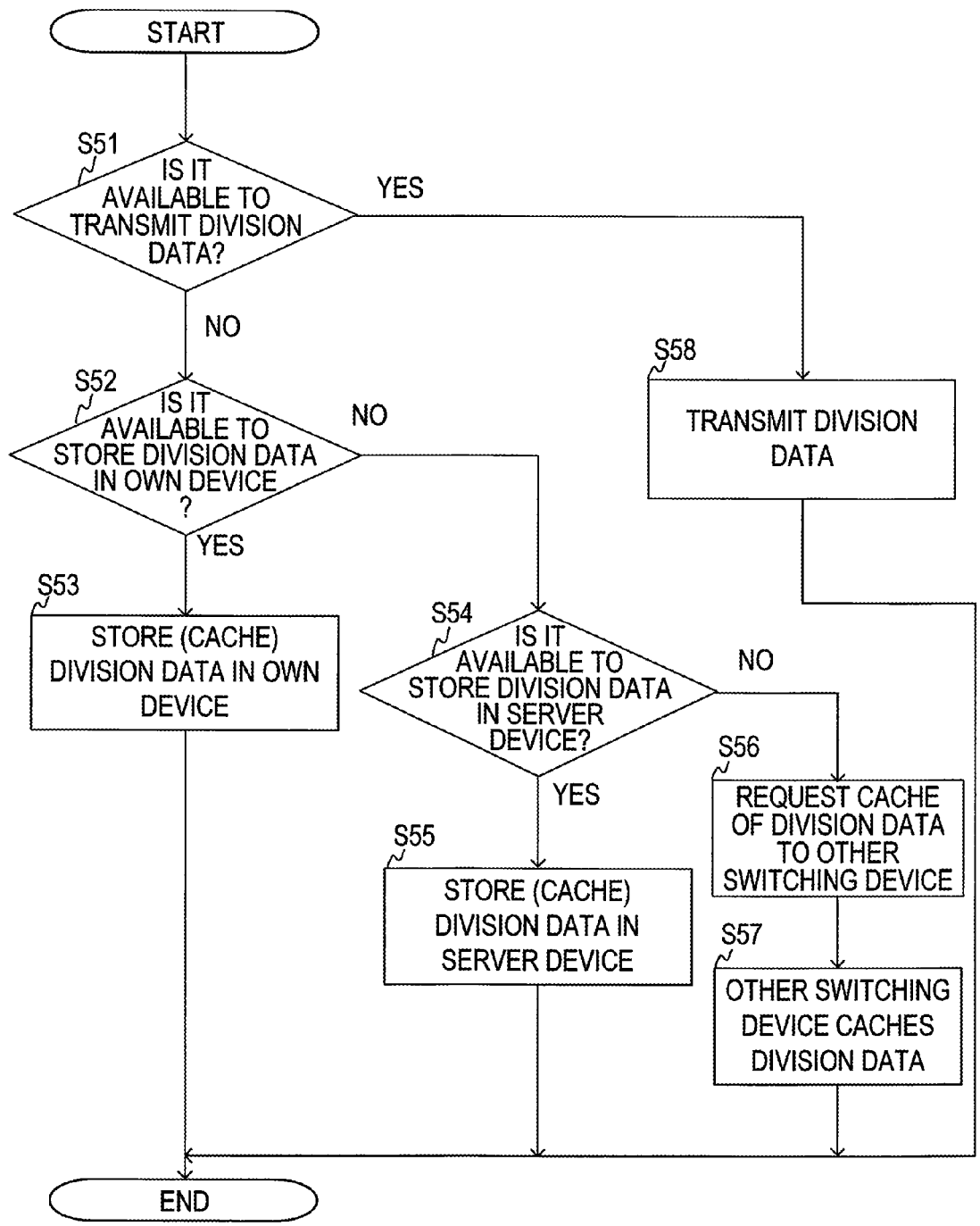
FIG. 26 is a flow diagram explaining an example of the flow of the cash processing in the switching device according to the third embodiment of FIG. 22.

FIG. 26 is a flow diagram to explain an example of the flow of the cache process in the switching device 210, 510 in the third embodiment of FIG. 22.

Because the process in the step S51-step S53, the step S55, and the step S58 of FIG. 26 is same process as the step S31-the step S33, the step S34 and the step S35 of FIG. 20, the explanations of the process in the step S51-step S53, the step S55, and the step S58 are omitted appropriately.

The switching device 210 of FIG. 23 carries out the process of the step S51 and the step S52 sequentially. When the whole administration unit 231 of FIG. 23 determines that the own device (the storing device 213 of FIG. 14) is not available to store the division data received (the step S52/NO), in the step S52, the process moves to the step S54.

Step S54: The whole administration unit 231 of FIG. 23 judges whether it is available to store division data which is received newly in the server device to connect with the own device. When the whole administration device 231 judges that it is available to store division data (the step S54/YES), the process moves to the step S55. When the whole administration device 231 judges that it is not available to store division data (the step S54/NO), the process moves to the step S56.

Step S56: The cache request unit (use for the switching device) 238 of FIG. 23 performs a cache request to the other switching device, that is, the switching device 510 in the fifth datacenter DC50 in the above example.

Step S57: The division data reception control unit 534b in the switching device 510 of FIG. 25 sequentially stores the division data of which the reception unit 534 received in the storing device 513 of FIG. 24.

As described in the third embodiment, when it is not available that the switching device did the cache of the division data to the own device and the server device which connects to the own device, the other switching device carries out the cache process of division data. It is possible to cache a large quantity of division data in the switching device and the server device. Specially, when a lot of switching devices are located on a network course from the first datacenter DC10 of the origin of movement to the fourth datacenter DC40 of the destination of movement, it is possible to cache larger quantity of division data in the switching device and the server device by larger quantity of division data because these switching devices carry out the cache process of division data recursively.

[Fourth Embodiment]

In the third embodiment, the switching device carried out the cache request to other switching device. The other switching device is a switching device 510 provided on the network route (connection route) between the datacenter DC10 of the origin of movement and the fourth datacenter DC40 of the destination of movement. The network route between the datacenter DC10 of the origin of movement to the fourth datacenter DC40 of the destination of movement is called as the same topology.

In the fourth embodiment, it is explained that a certain switching device carries out the cache request to a switching device established in a topology out of same topology, that is, network route which is diverged from the network route between the datacenter DC10 of the origin of movement to the fourth datacenter DC40 of the destination of movement.

(Information System)

Figure 27:
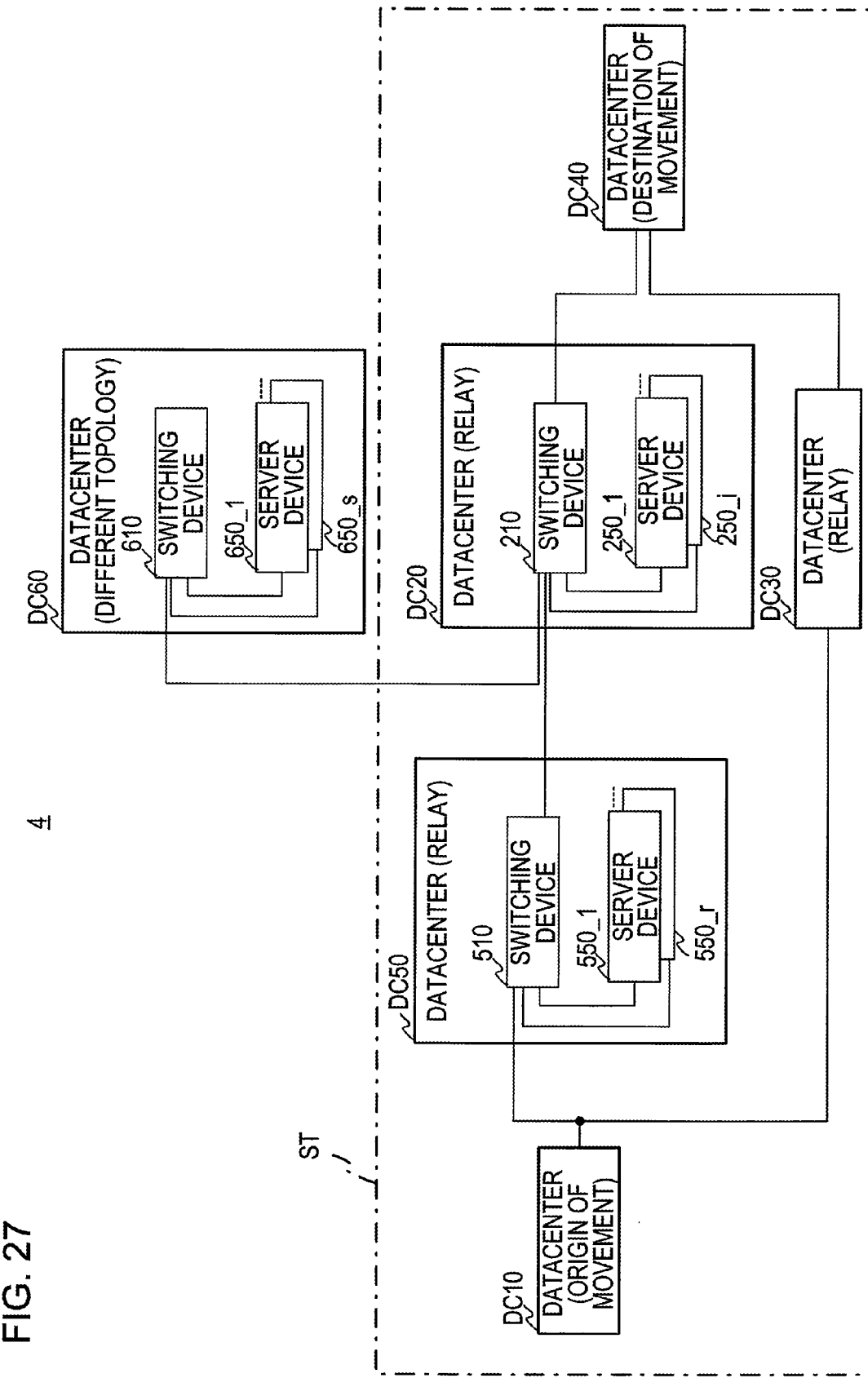
FIG. 27 is a schematic structure diagram of the information processing system according to a fourth embodiment.

FIG. 27 is a block diagram of outline constitution of information system 4 according to fourth embodiment. The information system 4 further includes a sixth datacenter DC60 in addition to the first datacenter DC10-the fifth datacenter DC50 which is explained with the information system 3 of FIG. 22. In FIG. 27, same topology is surrounded by a dashed line indicated by a mark 'ST'.

The sixth datacenter 60 is a datacenter to connect with the second datacenter DC20, and is established on the network route that is diverged from the network route between the first datacenter DC10 of the origin of movement and the fourth datacenter DC40 of the destination of movement. In other words, the sixth datacenter DC60 is datacenter of the topology that is different from the same topology to indicate by the mark 'ST'.

The sixth datacenter DC60 includes a switching device 610 (a third network device) and a first server device 650_1-sth server device 650_s. The switching device 210 in the second datacenter DC20 connects with the switching device 610 in the sixth datacenter DC60 through a network. The switching device 610 in the sixth datacenter DC60 connects with the switching device 210 in the second datacenter DC20 and the first server device 650_1-sth server device 650_s through a network.

(Switching Device 210 in the Second Datacenter DC20)

Figure 28:
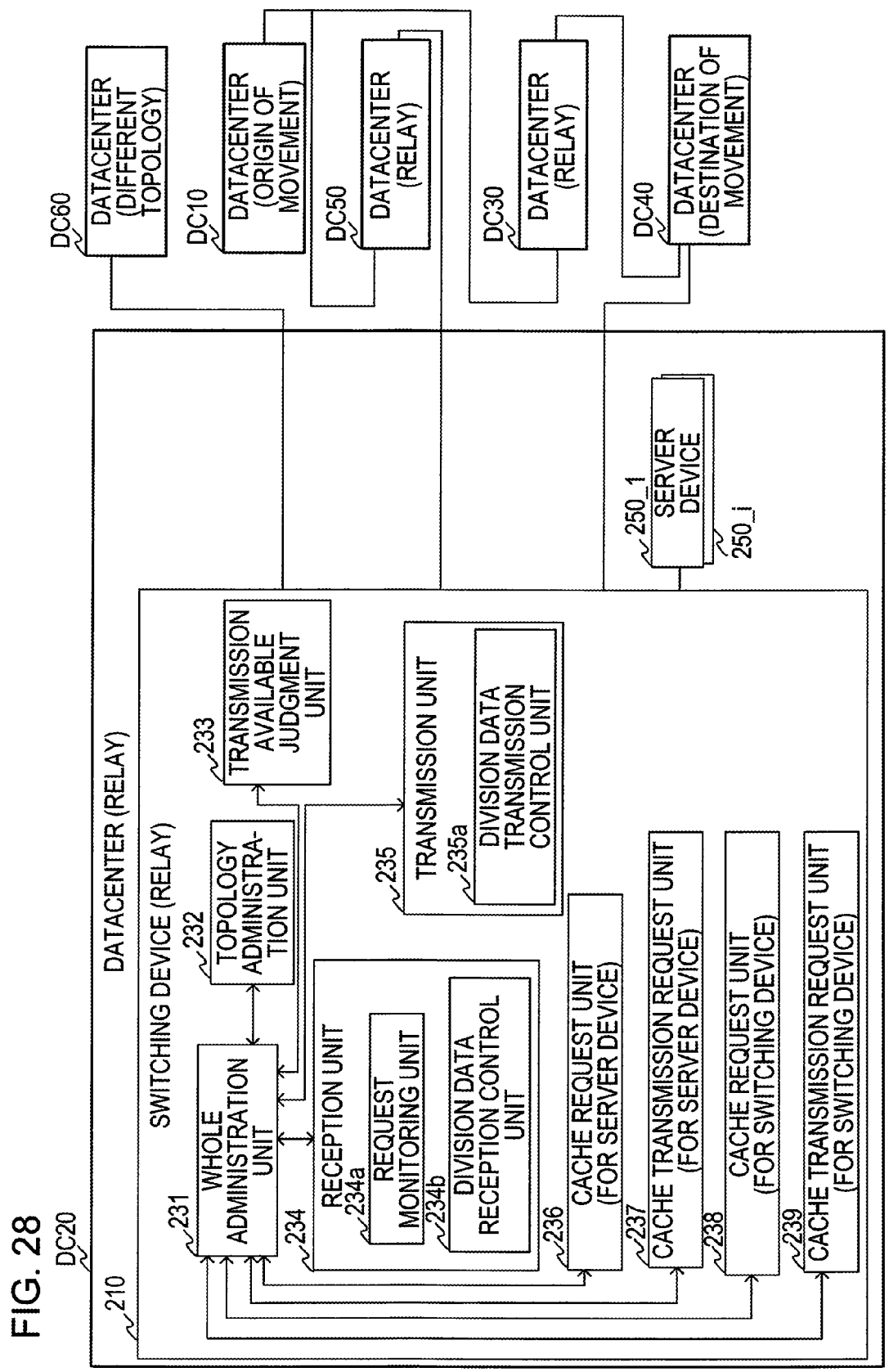
FIG. 28 is a block diagram illustrating the software module of the switching device according to the fourth embodiment of FIG. 27.

FIG. 28 is a block diagram indicating the software module of the switching device 210 in according to the fourth embodiment of FIG. 27. The switching device 210 includes a cache transmission request unit (for use of the switching device) 239 which requests the transmission process of the division data which are cached to the other switching device of different topology, in addition to each block as explained in FIG. 25. The topology administration unit 231 manages information to identify the other switching device of different topology, for example, the IP address, etc.

In addition, the CPU 211 in the switching device 210 explained in FIG. 14 carries out the software module of FIG. 28 as explained by FIG. 14.

(Switching Device 610 in the Sixth Datacenter DC60)

Based on FIG. 29 and FIG. 30, the switching device 610 in the sixth datacenter DC60 on a different topology will be explained.

Figure 29:
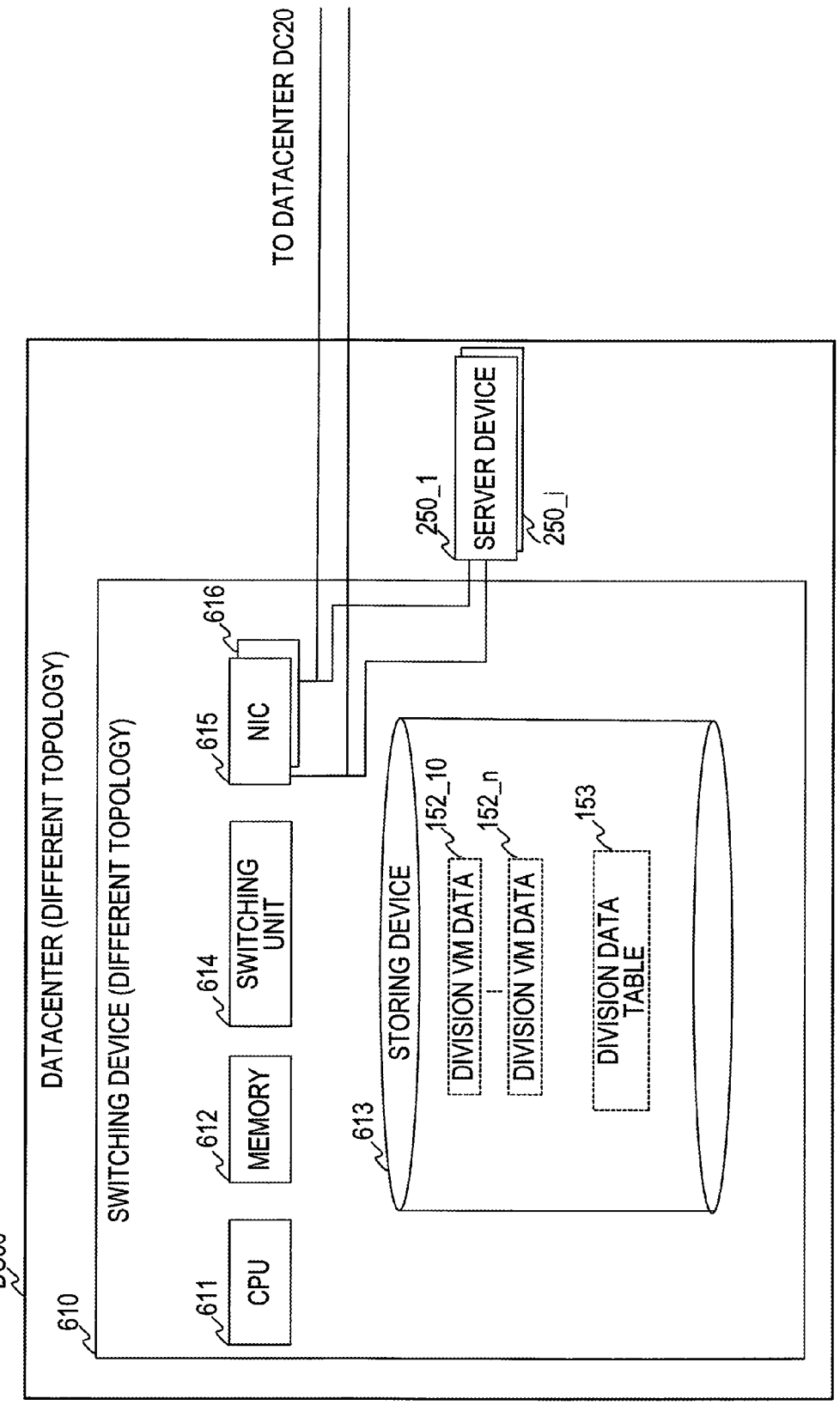
FIG. 29 is a block diagram illustrating the hardware organization of the switching device of different topology according to the fourth embodiment of FIG. 27.

FIG. 29 is a block diagram indicating the hardware constitution of the switching device 610 on the different topology according to the fourth embodiment of FIG. 27.

Figure 30:
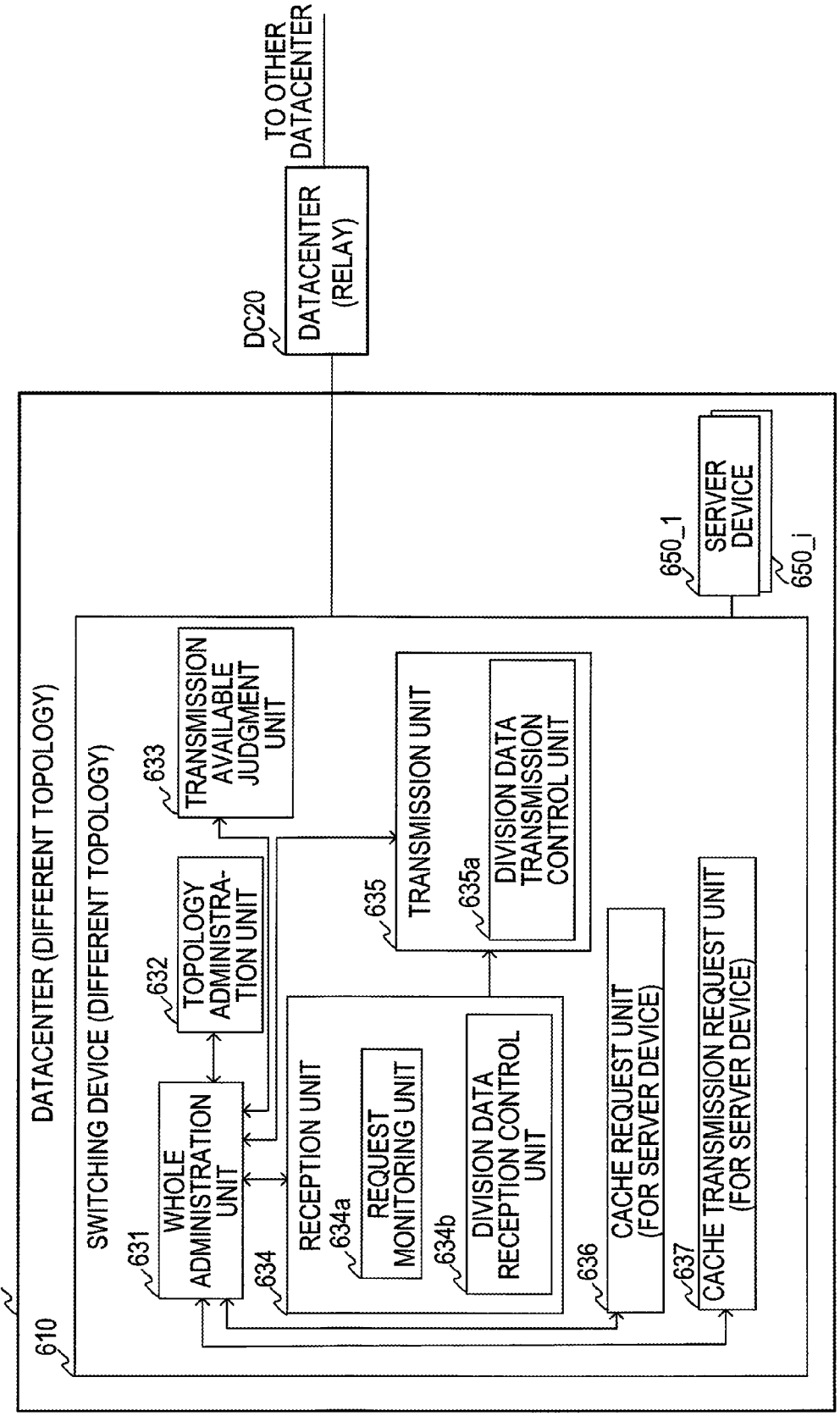
FIG. 30 is a block diagram illustrating the software module of the switching device of different topology according to the fourth embodiment of FIG. 27.

FIG. 30 is a block diagram indicating the software module of the switching device 610 on the different topology according to the fourth embodiment of FIG. 27.

The CPU 611, the memory 612, the storing device 613, the switching device 614, the first NIC 615 and the second NIC 616 in FIG. 29 have same functions as the CPU 211, the memory 212, the storing device 213, the switching device 214, the first NIC 215 and the second NIC 216 in FIG. 14, respectively.

The whole administration unit 631, the topology administration unit 632, the transmission available judgment unit 633, the reception unit 634, the transmission unit 635, the cache request unit (use for the server device) 636, and the cache transmission request unit 637 in FIG. 30 have same function as the whole administration unit 231, the topology administration unit 232, the transmission available judgment unit 233, the reception unit 234, the transmission unit 235, the cache request unit (use for the server device) 236, and the cache transmission request unit (use for the server device) 237 in FIG. 15, respectively.

(Cache Process that the Switching Device 210 in the Second Datacenter DC20 Carries Out)

Based on FIG. 17, FIG. 25, and FIG. 28, the cache process of the division data, of which the switching device 210 in the second datacenter DC20 carries out, will be explained.

In the following description, the switching device 510 in the fifth datacenter DC50 of FIG. 22 receives the division data transmitted by the first datacenter DC10 and transfers the division data received to the switching device 210 in the second datacenter DC20. And, as described in the third embodiment, the whole administration unit 231 in the switching device 210 in FIG. 28 judged that it is not available to store the division data which is newly received to the server device 250_1 of FIG. 17.

According to the judgment, the whole administration unit 231 instructs to the cache request unit 238 to perform the cache request to the other switching device. Here, the other switching device is a switching device provided on the virtual machine execution apparatus 130_1 of the origin of movement side on the basis of the switching device 210 (own device). In the case of FIG. 27, it is the switching device 510 in the fifth datacenter DC50 of same topology.

When the reception unit 534 in the switching device 510 of FIG. 25 receives the cache request from the switching device 210, the request monitoring unit 534a in the switching device 510 of FIG. 25 notifies to the whole administration unit 531 that the cache request was received from the switching device 210 of FIG. 23. The whole administration unit 531 judges whether it is available to store the division data received in the storing device 513 of the own device or the server device 550_1 to connect with the own device in response to this notice.

Here, when the whole administration unit 531 judged that it is not available to carry out the cache process of the division data due to lack of free space in the storing device 513 (referring to FIG. 24) of the own device and the storing device such as the server device 550_1 which connects with the own device, the whole administration unit 531 notifies that cache is not available to the switching device 210 of FIG. 28.

By this notice, it is possible that the whole administration unit 231 in the switching device 210 of FIG. 28 determines that the other switching device (for example, the switching device 510 in FIG. 25) of the same topology performs the cache of the division data.

When the reception unit 234 in the switching device 210 of FIG. 28 receives a notice that this cache is not available, the whole administration unit 231 determines that the switching device 510 of FIG. 25 is not available to cache the division data (that is, the cache request is not available).

And the whole administration unit 231 instructs to the cache request unit 238, for example, to request the cache to the other switching device 610 of different topology. The cache request unit 238 carries out a cache request to the other switching device 610 in response to this cache request instruction.

Furthermore, the whole administration unit 231 in the switching device 210 of FIG. 28 outputs the division data table 153 (referring to FIG. 9) in the storing device 213 (referring to FIG. 14) of the own device to the transmission unit 235 and instructs to transmit it to the other switching device 610 of different topology. The transmission unit 235 transmits the division data table 153 to the other switching device 610 of the different topology in response to this transmission instruction.

And the whole administration unit 231 instructs to the transmission unit 235 to transmit the division data of which the division data reception unit 234 receives afterward to the other switching device 610 of the different topology. The division data transmission control unit 235a in the transmission unit 235 transmits (transfers) the division data of which the division data reception unit 234 receives to the other switching device 610 of different topology in response to this instruction.

In addition, the whole administration unit 231 stores, an identifier of the division data which is transmitted to a device of the destination of the cache request and an identifier to distinguish a device of the destination of the cache request uniquely, in the cache management table (referring to FIG. 19) at the same time. In the above example, the device of the cash request is the other switching device 610 of the different topology.

(Cache Process that the Switching Device 610 in the Sixth Datacenter DC60 Carries Out)

The reception unit 634 in the switching device 610 of FIG. 30 receives the cache request and the division data table 153. Here, the request monitoring unit 634a always monitors the reception of the cache request. When the reception unit 634 receives the cache request, the request monitoring unit 634a notifies to the whole administration unit 631 that the cache request is received. The whole administration unit 631 stores the division data table 153 of which the reception unit 634 received in the storing device 613 (referring to FIG. 29) in response to this notice.

And the reception unit 634 of FIG. 30 receives the division data from the switching device 210 of FIG. 28. The division data reception control unit 634b in the reception unit 634 stores the division data in the storing device 613 (referring to FIG. 29). In the example of FIG. 29, the division data reception control unit 534b stores the division VM data 152_10-division VM data 152_n in the storing device 613.

In addition, the switching device 610 of FIG. 30 may store the division data in the server device 650_1 which connects to an own device when the free space of the storing device 613 (referring to FIG. 29) of the own device is not sufficient as described in the second embodiment.

(Transmission Process of Division Data which Did a Cache)

Based on FIG. 28-FIG. 30, the transmission process of division data cached by the switching device 210 and the switching device 610 will be explained.

As described in the second embodiment, when the transmission available judgment unit 233 in the switching device 210 of FIG. 28 determines that it is available to transmit the data to the switching device of the destination of movement, the whole administration unit 231 instructs to the transmission unit 235 to transmit the division data in the storing device 213 of the own device. The transmission unit 235 transmits this division data in response to this transmission instruction.

Furthermore, the whole administration unit 231 judges whether the division data is stored to the other switching device 610 of the different topology. For example, when the cache request administration table, which stores an IP address of the other switching device 610 of the different topology, is stored in the storing device 213 of FIG. 29, the whole administration unit 231 determines to have stored the division data to the other switching device 610 of different topology.

When the whole administration unit 231 determines to have stored the division data to the other switching device 610 of different topology, the whole administration unit 231 instructs to the cache transmission request unit (use for the switching device) 239 to carry out the cache transmission request. The cache transmission request unit 239 instructs to the other switching device 610 of the different topology to carry out the transmission of division data in response to this cache transmission request instruction.

The reception unit 632 in the other switching device 610 of the different topology of FIG. 30 receives the cache transmission request of division data from the switching device 210. When the reception unit 634 receives the cache transmission request, the request monitoring unit 634a notifies to the whole administration unit 631 that the cache transmission request is received.

The whole administration unit 631 instructs to the division data transmission control unit 635a in the transmission unit 635 to transmit the division data in the storing device 513 of FIG. 29 to the switching device 210 in response to this notice. The division data transmission control unit 635a transmits the division data in the storing device 613 to the switching device 210 in response to this transmission instruction. In addition, the division data transmission control unit 635a transmits the division data of which the context identifier indicates to "1" with precedence.

In the example of FIG. 29, the division data transmission control unit 635a transmits the division VM data 151_10-151_n to the switching device 210 of FIG. 28.

The division data reception control unit 234b in the switching device 210 of FIG. 28 outputs the division data that the reception unit 234 received from the other switching device 610 of the different topology to the transmission unit 235. The division data transmission control unit 235a in the transmission unit 235 transmits input division data to the switching device 410 in the fourth datacenter DC40.

(Flow of the Cache Process in the Switching Device)

Figure 31:
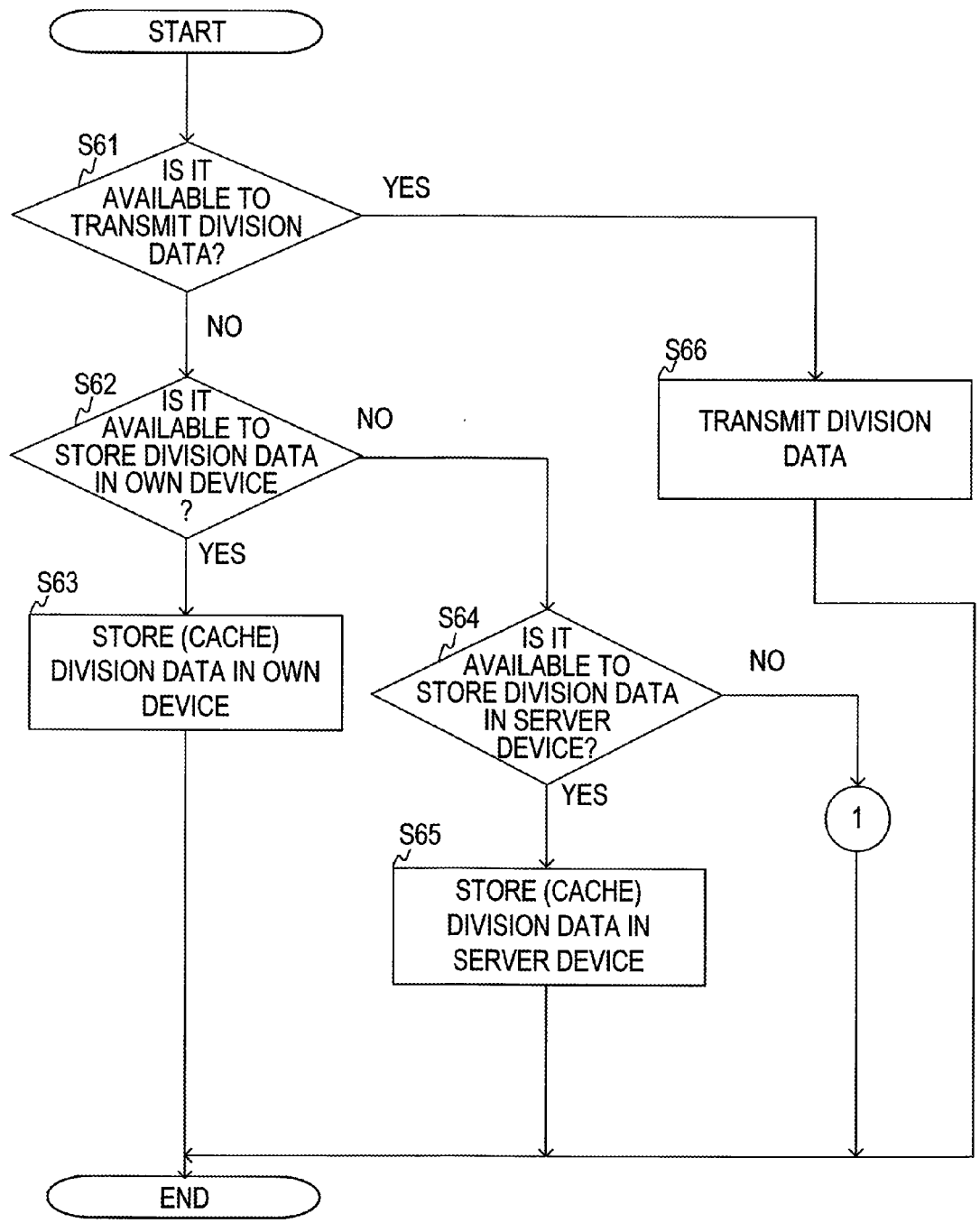
FIG. 31 is a first flow diagram explaining the cash processing of the switching device according to the fourth embodiment of FIG. 27.
Figure 32:
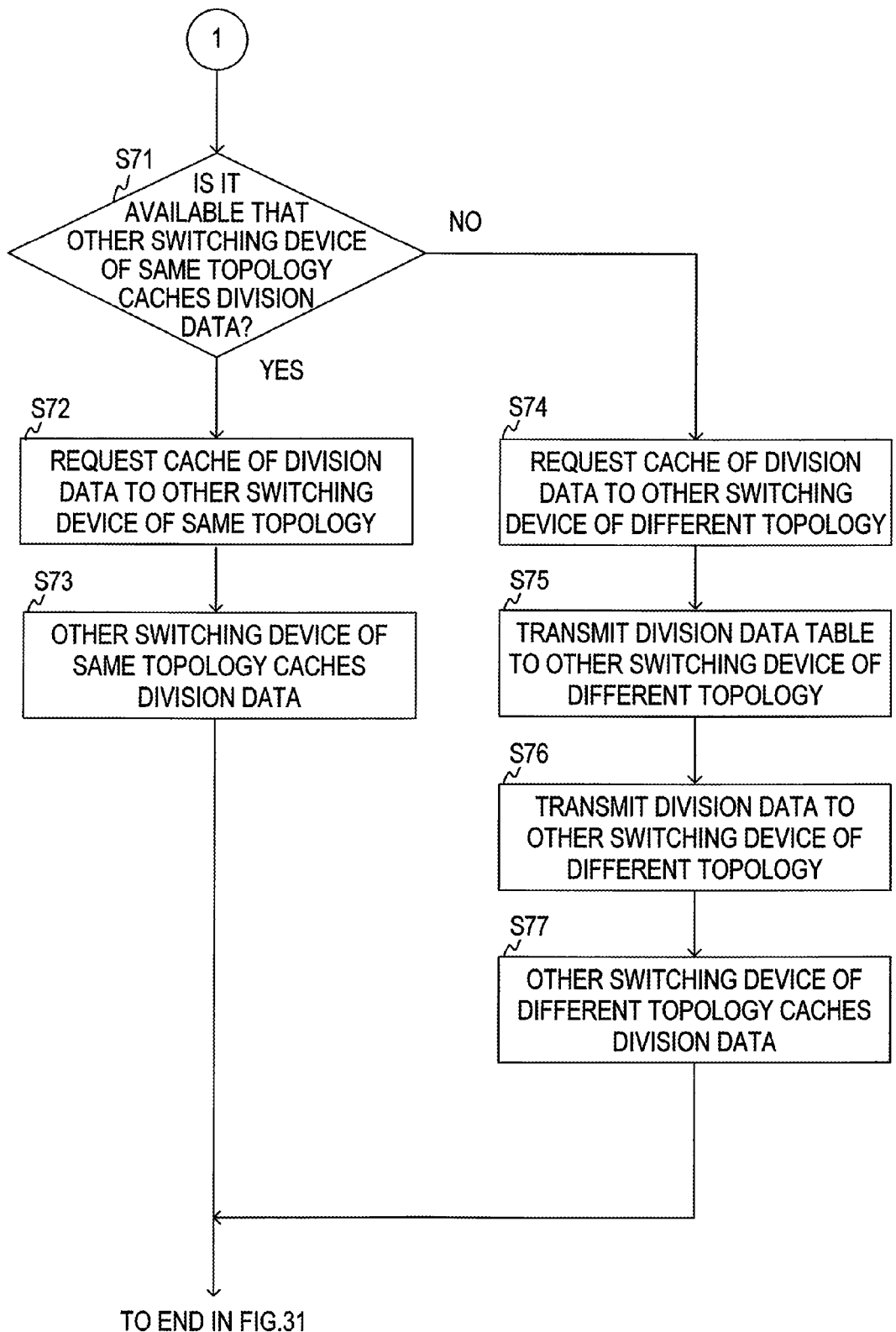
FIG. 32 is a second flow diagram explaining the cash processing of the switching device according to the fourth embodiment of FIG. 27.

FIG. 31 is a first flow diagram to explain the cache process in the switching device according to the fourth embodiment of FIG. 27. FIG. 32 is a second flow diagram to explain the cache process in the switching device according to the fourth embodiment of FIG. 27.

In FIG. 31, the process in the step S61-S66 is same process as the step S51-step S56 in FIG. 26. Therefore, explanations of the process in the step S61-S66 are omitted appropriately.

The switching device 210 of FIG. 28 carries out the process of the step S61-step S64 sequentially. When the whole administration unit 231 of FIG. 28 determines that it is not available to store the division data received in the server device 250_1 which connects to the own device (the step S64/NO), in the step S64, the process moves to the step S71 of FIG. 32.

Step S71: The whole administration unit 231 in the switching device 210 of FIG. 28 judges whether it is available that other switching device of the same topology caches the division data. Here, the other switching device of the same topology is a switching device 510 in the fifth datacenter DC50 in the above example.

When the cache of division data is available (the step S71/YES), the process moves to the step S72. In addition, explanations of the process of the step S72 and the step S73 is omitted because the process of the step S72 and the step S73 are similar to the process of the step S56 and the step S57 of FIG. 26.

When the cache of division data is not available (the step S71/NO), the process moves to the step S74.

Step S74: The cache request unit 238 in FIG. 28 performs a cache request to other switching device of different topology. Here, the other switching device of different topology is a switching device 610 in the sixth datacenter DC60 in the example mentioned above.

Step S75: The transmission unit 235 in FIG. 28 transmits the division data table 153 to the other switching device 610 of different topology.

Step S76: The division data transmission control unit 235*a* in the transmission unit 235 in FIG. 28, transmits the division data in which the reception unit 234 received to the other switching device 610 (referring to FIG. 30) of the different topology.

Step S77: The division data reception control unit 634*b* in the switching device 610 of FIG. 30 stores (caches) the division data which are received in the storing device 613 (referring to FIG. 29).

By the process explained in FIG. 31 and FIG. 32, it is possible that the other switching device of different topology performs the storage process of the division data.

In addition, in the information system 4 of FIG. 27, there is a case that the switching device 210 in the datacenter DC20 connects with the switching device 310 in the third datacenter DC30 (referring to FIG. 1). In such a connection, the switching device 210 in the datacenter DC20 may perform the cache request to the switching device 310 in the datacenter DC30 and the switching device 310 in the datacenter DC30 may perform the cache process of the division data.

According to the embodiment, it is possible to temporary store the division data of the virtual machine for the migration target by using the switching device and the server device on the network. Especially, because the storage process of the division data is performed by a large number of the switching device and the server device in the network route, it is possible to perform the storage process of the division data relating to the virtual machine of several thousands and tens of thousands of units according to the information system in the embodiment.

In addition, an approach, which transmits the division data to the other switching device quickly using a technique to make the band of the network big, is considered. For example, the technique is a multi-path technique by using a plurality of network or a redundant technique of NIC in the server device provided in the data center, so-called Bonding technology. Besides, for example, there is a technology that aggregates a plural physical line to virtually one line and treats as one line, so-called Link Aggregation technology. However, even using such a technique, it has a limit to make a network band big. Especially, a bottleneck of the network occurs even though a big network band is provided, when carrying out the migration of several thousand, or of tens of thousands of virtual machines. Therefore, it is not possible that the virtual machine execution apparatus of the origin of movement transmits the division data to the other switching device quickly as above mentioned. Even though this case, according to the information system of the embodiment, it is possible to perform the storage process of the division data relating to the virtual machines of several thousand, or of tens of thousands of units. Therefore it is possible that the virtual machine execution apparatus of the origin of movement transmits data to the switching device and the server device of other datacenter quickly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An information processing system comprising:
a plurality of network devices configured to perform data communication process; and
first and second virtual machine execution apparatuses, the first virtual machine execution apparatus configured to perform a first virtual machine, divide data relating to the first virtual machine in a plurality of division data and transmit the division data to the second virtual machine execution apparatus via a first network device and a second network device among the plurality of network devices in response to a migration instruction of the first virtual machine accompanying occurrence of failure of the first virtual machine execution apparatus;
the second virtual machine execution apparatus configured to perform a second virtual machine and build up the first virtual machine based on the division data transmitted from the first virtual machine execution apparatus;
the plurality of network devices provided between the first virtual machine execution apparatus and the second virtual machine execution apparatus,
wherein the first network device is configured to transmit, to the second network device which is provided at a side of the second virtual machine execution apparatus among the plurality of network devices, a confirmation signal to inquire whether the second network device is available to receive the division data transmitted from the first virtual machine execution apparatus, store the division data transmitted from the first virtual machine execution apparatus in a storing device upon receiving, from the second network device, a negative acknowledgement indicating that the second network device is not available to receive the division data and transmit the division data in the storing device to the second network device when receiving, from the second network device, an acknowledgement indicating that the second network device is available to receive the division data, and wherein the second network device is configured to transmit the division data transmitted from the first network device to the second virtual machine execution apparatus.

2. The information processing system according to claim 1, wherein the first virtual machine execution apparatus is configured to create an identifier storing table which is stored a division data identifier to distinguish the division data, transmit the identifier storing table and the division data which is added the division data identifier to the first network device, and
wherein the first network device is configured to store the division data which includes a identifier stored in the identifier storing table.

3. The information processing system according to claim 2, wherein the first virtual machine execution apparatus is configured to judge whether the division data is a first kind data relating to an information processing that the first virtual machine execution apparatus is executing or a second kind data not relating to the information processing, add a first identifier to the division data when the division data is the first kind data, add a second identifier to the division data when the division data is the second kind data, and preferentially transmit the division data added the first identifier to the division data added the second identifier.

4. The information processing system according to claim 3, wherein the first network device is configured to preferentially transmit the division data added the first identifier to the division data added the second identifier among the plurality of division data in the storing device.

5. The information processing system according to claim 4, wherein the information processing system further comprising a server device which is connected to the first network device, and
wherein the first network device is configured to determine whether it is available to store the division data in the storing device of an own device, and store the division data in the server device when it is not available to store the division data in the storing device of the own device.

6. The information processing system according to claim 5, wherein the first network device is configured to determine whether it is available to store the division data in the server device which is connected to the own device, perform a storing request of the division data to a third network device which is connected to the first network device when it is not available to store the division data in the server device, and
wherein the third network device is configured to store the division data in the storing device of the own device in response to the storing request.

7. The information processing system according to claim 6, wherein the third network device is a network device which is provided at a side of the first virtual machine execution apparatus on a basis of the first network device.

8. The information processing system according to claim 6, wherein the third network device is a network device which is provided at a connection route which is diverged from a connection route between the first virtual machine execution apparatus and the second virtual machine execution apparatus, and
wherein the first network device is configured to transmit the division data which is received to the third network device.

9. The information processing system according to claim 1, wherein the information system further comprising:

a first data center which includes the first virtual machine execution apparatus; and
a second data center which includes the second virtual machine execution apparatus and is provided at a geographical separated area from the first virtual machine execution apparatus.

10. An information processing method in an information processing system including a first virtual machine execution apparatus configured to perform a first virtual machine, a second virtual machine execution apparatus configured to perform a second virtual machine and a plurality of network devices provided between the first virtual machine execution apparatus and the second virtual machine execution apparatus and configured to perform data communication process, the method comprising:
dividing data relating to the first virtual machine in a plurality of division data by the first virtual machine execution apparatus;
a first transmitting of the division data to the second virtual machine execution apparatus via a first network device and a second network device among the plurality of network devices, in response to a migration instruction of the first virtual machine accompanying occurrence of failure of the first virtual machine execution apparatus, by the first virtual machine execution apparatus;
transmitting, to the second network device, provided at a side of the second virtual machine execution apparatus among the plurality of network devices, a confirmation signal to inquire whether the second network device is available to receive the division data transmitted from the first virtual machine execution apparatus by the first network device;
storing the division data, transmitted from the first virtual machine execution apparatus, in a storing device upon receiving at the first network device a negative acknowledgment from the second network device indicating that the second network device is not available to receive the division data;
a second transmitting of the division data in the storing device to the second network device upon receiving at the first network device an acknowledgement from the second network device indicating that the second network device is available to receive the division data; and
building up the first virtual machine based on the division data transmitted from the first virtual machine execution apparatus by the second virtual machine execution apparatus.

11. The information processing method according to claim 10, wherein the first transmitting further comprising:
creating an identifier storing table which is stored a division data identifier to distinguish the division data; and
a third transmitting the identifier storing table and the division data which is added the division data identifier to the first network device, and
wherein the storing further comprising storing the division data which includes a identifier stored in the identifier storing table.

12. The information processing method according to claim 11, wherein the first transmitting further comprising:
judging whether the division data is a first kind data relating to an information processing that the first virtual machine execution apparatus is executing or a second kind data not relating to the information processing;

adding a first identifier to the division data when the division data is the first kind data;

adding a second identifier to the division data when the division data is the second kind data; and preferentially transmitting the division data added the first identifier to the division data added the second identifier.

13. The information processing method according to claim 12, wherein the second transmitting by the first network device further comprising preferentially transmitting the division data added the first identifier to the division data added the second identifier among the plurality of division data in the storing device.

14. The information processing method according to claim 13, wherein the information processing system further comprising a server device which is connected to the first network device, and wherein the storing further comprising:

a first determining whether it is available to store the division data in the storing device of an own device; and storing the division data in the server device when it is not available to store the division data in the storing device of the own device.

15. The information processing method according to claim 14, wherein the first determining further comprising:

a second determining whether it is available to store the division data in the server device which is connected to the own device;

performing a storing request of the division data to a third network device which is connected to the first network device when it is not available to store the division data in the server device, and storing the division data in the storing device of the third network device.

16. The information processing method according to claim 15, wherein the third network device is a network device which is provided at a side of the first virtual machine execution apparatus on a basis of the first network device.

17. The information processing method according to claim 15, wherein the third network device is a network device which is provided at a connection route which is diverged from a connection route between the first virtual machine execution apparatus and the second virtual machine execution apparatus, and wherein the second transmitting comprising transmitting the division data which is received to the third network device.

18. A non-transitory computer readable recording medium having stored therein a program for causing a computer of a first network device to execute an information process comprising:

after a first virtual machine execution apparatus which performs a first virtual machine divides data relating to the first virtual machine in a plurality of division data and transmits the division data to the first network device in response to a migration instruction of the first virtual machine accompanying occurrence of failure of the first virtual machine execution apparatus, transmitting, to a second network device which is provided at a side of a second virtual machine execution apparatus which receives the division data transmitted from the second network device, a confirmation signal to inquire whether the second network device is available to receive the division data transmitted from the first virtual machine execution apparatus;

storing the division data in a storing device upon receiving, from the second network device, a negative acknowledgement indicating that the second network device is not available to receive the division data; and transmitting the division data in the storing device to the second network device upon receiving, from the second network device, an acknowledgement indicating that the second network device is available to receive the division.

19. The non-transitory computer readable recording medium according to claim 18, wherein storing further comprising:

receiving an identifier storing table which is stored a division data identifier to distinguish the division data and is transmitted from the first virtual machine execution apparatus and storing the identifier storing table in the storing device; and receiving the division data which includes a identifier stored in the identifier storing table and storing the division data which includes the identifier in the storing device.

20. The non-transitory computer readable recording medium according to claim 19, wherein the storing further comprising:

receiving a first division data added a first identifier and a second division data added a second identifier and storing the first and second division data in the storing device, and wherein the transmitting further comprising preferentially transmitting the division data added the first identifier to the division data added the second identifier.

* * * * *